(12) United States Patent
Shenfield et al.

(10) Patent No.: US 7,941,784 B2
(45) Date of Patent: May 10, 2011

(54) SYSTEM AND METHOD FOR GENERATING COMPONENT BASED APPLICATIONS

(75) Inventors: Michael Shenfield, Richmond Hill (CA); Bryan R. Goring, Milton (CA); David DeBruin, Guelph (CA)

(73) Assignee: Research In Motion Limited, Waterloo, Ontario ( * ) Notice: Subject to any disclaimer, the term of this patent is extended or adjusted under 35 U.S.C. 154(b) by 753 days.

(21) Appl. No.: 11/078,331

(22) Filed: Mar. 14, 2005

(65) Prior Publication Data

US 2006/0206861 A1 Sep. 14, 2006

(51) Int. Cl.
*G06F 9/44* (2006.01)

(52) U.S. Cl. ...................................... 717/107

(58) Field of Classification Search .......... 717/107–109, 717/116, 120–122
See application file for complete search history.

(56) References Cited

U.S. PATENT DOCUMENTS

| | | | |
|---|---|---|---|
| 6,104,874 A * | 8/2000 | Branson et al. | 717/108 |
| 6,226,788 B1 * | 5/2001 | Schoening et al. | 717/107 |
| 6,253,366 B1 * | 6/2001 | Mutschler, III | 717/104 |
| 6,957,417 B2 * | 10/2005 | Turner et al. | 717/108 |
| 7,076,766 B2 * | 7/2006 | Wirts et al. | 717/121 |
| 7,149,734 B2 * | 12/2006 | Carlson et al. | 707/6 |
| 7,178,129 B2 * | 2/2007 | Katz | 717/108 |
| 7,219,327 B1 * | 5/2007 | Jacobs et al. | 717/104 |
| 7,493,594 B2 | 2/2009 | Shenfield et al. | |
| 2002/0026474 A1 | 2/2002 | Wang et al. | |
| 2003/0167456 A1 * | 9/2003 | Sabharwal | 717/108 |
| 2004/0003400 A1 | 1/2004 | Carney et al. | |

(Continued)

FOREIGN PATENT DOCUMENTS

WO 98/30962 A 7/1998

(Continued)

OTHER PUBLICATIONS

European Search Report, Application No. EP 05 10 1956.

(Continued)

*Primary Examiner* — Philip Wang
(74) *Attorney, Agent, or Firm* — Xiang Lu; Gowling Lafleur Henderson LLP

(57) ABSTRACT

A system and method for generating an application based on a first component having definitions expressed in a structured definition language and a second component having a series of instructions. The component applications comprise data components, presentation components, and message components, which are written in XML code. The component applications further comprise workflow components which are written in a subset of ECMAScript, and are augmented with the XML code. The components define the processing on a device runtime environment of messages communicated over a network between the device and a datasource. The system and method have a data model for providing a persistent state of the application including the component definitions and the series of instructions. The system and method also have a code module for obtaining the components from the data model and for generating a first application element including code representing the component definitions. The system and method also have a mappings module for obtaining datasource mapping information from the data model and for generating a second application element including mapping file descriptors corresponding to the datasource mapping information, the mapping information for use in communication of the messages between the device runtime environment and the datasource. The system and method also have a resource module for collecting application resources and for generating a third application element including the resources, wherein the application elements are subsequently packaged as a deployable form of the application.

26 Claims, 12 Drawing Sheets

U.S. PATENT DOCUMENTS

| | | | |
|---|---|---|---|
| 2004/0172555 A1 | 9/2004 | Beringer et al. | |
| 2004/0177335 A1 | 9/2004 | Beisiegel et al. | |
| 2005/0005261 A1* | 1/2005 | Severin | 717/108 |
| 2005/0166196 A1* | 7/2005 | Grier et al. | 717/162 |
| 2006/0036941 A1* | 2/2006 | Neil | 715/526 |
| 2006/0047665 A1* | 3/2006 | Neil | 707/10 |
| 2006/0206863 A1* | 9/2006 | Shenfield et al. | 717/107 |
| 2006/0206864 A1 | 9/2006 | Shenfield et al. | |
| 2006/0206890 A1* | 9/2006 | Shenfield et al. | 717/174 |

FOREIGN PATENT DOCUMENTS

| | | |
|---|---|---|
| WO | 01/46802 A | 6/2001 |
| WO | WO 2004/059938 A | 7/2004 |

OTHER PUBLICATIONS

Office Action issued by the Canadian Intellectual Property Office dated Jan. 29, 2008 for corresponding Canadian Patent Application No. 2,539,047.

Notice of Allowance and Fees Due for corresponding U.S. Appl. No. 11/078,427 issued Oct. 9, 2008.

European Search Report issued by the European Patent Office dated Aug. 19, 2005 for corresponding European Patent Application No. 05101958.6.

"Deploying Blackberry Desktop and Handheld Software", 2003, XP002288590.

Abrams, M. et al., "UIML: an appliance-independent XML user interface language", May 17, 1999, XP004304584, abstract, p. 1699, left-hand column, line 22- p. 1701, right-hand column, last line.

Xiulan, Yu et al., "WSCE: a flexible web service composition environment", Jul. 6, 2004, pp. 428-435, XP010708875, the whole document.

European Search Report issued by the European Patent Office dated Nov. 9, 2005 for corresponding European Patent Application No. 05101955.2.

European Search Report issued by the European Patent Office dated Aug. 29, 2005 for corresponding European Patent Application No. 05101890.1.

* cited by examiner

SYSTEM AND METHOD FOR GENERATING COMPONENT BASED APPLICATIONS

REFERENCE TO A COMPUTER PROGRAM LISTING APPENDIX

A computer program listing appendix is filed herewith submitted on a single compact disc (Copy 1) and a duplicate copy (Copy 2) of the compact disk. The contents of the compact disk, and its duplicate copy, include five (5) ASCII files entitled, "11078331_0.txt", "11078331_1.txt", "11078331_2.txt", "11078331_3.txt", and "11078331_4.txt". The contents of this computer program listing appendix, filed on compact disk, are incorporated herein by reference.

BACKGROUND

This application relates generally to generation of component based applications and their availability over a network.

There is a continually increasing number of terminals and mobile devices in use today, such as smart phones, PDAs with wireless communication capabilities, personal computers, self service kiosks and two-way pagers/communication devices. Software applications which run on these devices increase their utility. For example, a smart phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task.

Currently, mobile communication devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of mobile device, thereby providing a relatively optimized application program for each runtime environment. However, native applications have a disadvantage of not being platform independent, thereby necessitating the development of multiple versions of the same application, as well as being relatively large in size, thereby taxing the memory resources of the mobile device. Further, application developers need experience with programming languages such as Java™ and C++ to construct these hard coded native applications. There is a need for application development environments that can facilitate the generation of applications for selected devices and terminals with their respective runtime environment, as well as being capable of selecting from a variety of back-end data sources.

Systems and methods disclosed herein provide a component based application generation environment to obviate or mitigate at least some of the above presented disadvantages.

SUMMARY

Current software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task. Current application generation environments are not based on component application architecture, which facilitates generation of an application for running on clients having a wide variety of runtime environments. Native applications are an example of current applications which have disadvantages of not being platform independent, thereby necessitating the development and subsequent generation of multiple versions of the same application, as well as being relatively large in size, thereby taxing the memory resources of the mobile device.

Contrary to current application generation environments a system and method is provided for generating an application based on a first component having definitions expressed in a structured definition language and a second component having a series of instructions. The component applications comprise data components, presentation components, and message components, which are written in XML code. The component applications further comprise workflow components which are written in a subset of ECMAScript, and are augmented with XML code. The components define the processing on a device runtime environment of messages communicated over a network between the device and a datasource. The system and method have a data model for providing a persistent state of the application including the component definitions and the series of instructions. The system and method also have a code module for obtaining the components from the data model and for generating a first application element including code representing the component definitions. The system and method also have a mappings module for obtaining datasource mapping information from the data model and for generating a second application element including mapping file descriptors corresponding to the datasource mapping information, the mapping information for use in communication of the messages between the device runtime environment and the datasource. The system and method also have a resource module for collecting application resources and for generating a third application element including the resources, wherein the application elements are subsequently packaged as a deployable form of the application.

Accordingly, a system is provided for generating an application based on a first component having definitions expressed in a structured definition language and a second component having a series of instructions, the components for defining the processing on a device runtime environment of messages communicated over a network between the device and a datasource, the system comprising: a data model for providing a persistent state of the application including the component definitions and the series of instructions; a code module for obtaining the components from the data model and for generating a first application element including code representing the component definitions; a mappings module for obtaining datasource mapping information from the data model and for generating a second application element including mapping file descriptors corresponding to the datasource mapping information, the mapping information for use in communication of the messages between the device runtime environment and the datasource; and a resource module for collecting application resources and for generating a third application element including the resources; wherein the application elements are subsequently packaged as a deployable form of the application.

Also disclosed is a method for generating an application based on a first component having definitions expressed in a structured definition language and a second component having a series of instructions, the components for defining the processing on a device runtime environment of messages communicated over a network between the device and a datasource, the method comprising the steps of: obtaining the components from a data model and generating a first application element including code representing the component definitions, the data model for providing a persistent state of the application including the component definitions and the series of instructions; obtaining datasource mapping information from the data model and generating a second application element including mapping file descriptors corresponding to the datasource mapping information, the mapping information for use in communication of the messages between the device runtime environment and the datasource; and collecting application resources and generating a third application element including the resources; wherein the application elements are subsequently packaged as a deployable form of the application.

Also disclosed is a computer program product for generating an application based on a first component having definitions expressed in a structured definition language and a second component having a series of instructions, the components for defining the processing on a device runtime environment of messages communicated over a network between the device and a datasource, the computer program product comprising: a computer readable medium; a data model module stored on the computer readable medium for providing a persistent state of the application including the component definitions and the series of instructions; a code module coupled to the data model module for obtaining the components from the data model and for generating a first application element including code representing the component definitions; a mappings module coupled to the data model module for obtaining datasource mapping information from the data model and for generating a second application element including mapping file descriptors corresponding to the datasource mapping information, the mapping information for use in communication of the messages between the device runtime environment and the datasource; and a resource module stored on the computer readable medium for collecting application resources and for generating a third application element including the resources; wherein the application elements are subsequently packaged as a deployable form of the application.

BRIEF DESCRIPTION OF THE DRAWINGS

These and other features will become more apparent in the following detailed description in which reference is made to the appended drawings wherein.

DESCRIPTION

Network System

Figure 1:
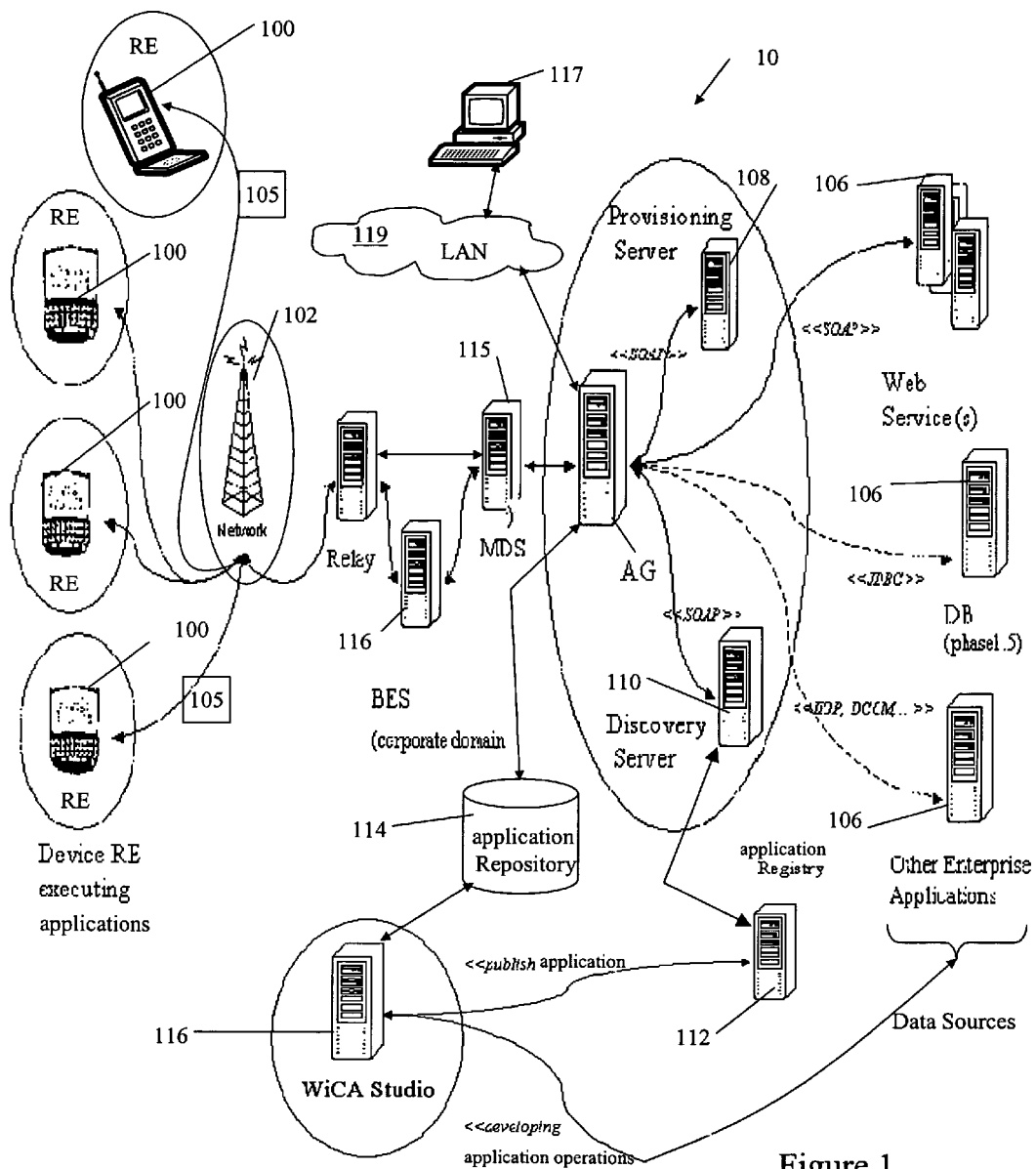
FIG. 1 is a block diagram of a communication network system.

Referring to FIG. 1, a network system 10 comprises mobile communication devices 100 for interacting with one or more backend data sources 106 (e.g. a schema based service such as web service or database that provides enterprise services used by an application 105) via a wireless network 102 coupled to an application gateway AG. The devices 100 are devices such as but not limited to mobile telephones, PDAs, two-way pagers, dual-mode communication devices. The network 10 can also have desktop computers 117 coupled though a local area network 119. The devices 100 and desktop computers 117 of the network 10 are hereafter referred to as the devices 100 for the sake of simplicity. It is recognised that the application gateway AG and data sources 106 can be linked via extranets (e.g. the Internet) and/or intranets as is known in the art. The application gateway AG handles request/response messages initiated by the application 105 as well as subscription notifications pushed to the device 100 from the data sources 106. The Application Gateway AG can function as a Data Mapping Server for mediating messaging between a client runtime RE on the device 100 and a backend server of the data sources 106. The Runtime Environment RE is an intelligent container that executes application 105 components and provides common services as needed for execution of the applications 105. The gateway AG can provide for asynchronous messaging for the applications 105 and can integrate and communicate with legacy back-end data sources 106. The devices 100 transmit and receive the Wireless Component Applications technology or wireless component applications 105, as further described below, when in communication with the data sources 106, as well as transmit/receive messaging associated with operation of the applications 105. The devices 100 can operate as web clients of the data sources 106 through execution of the applications 105 when provisioned on respective runtime environments RE of the devices 100.

For satisfying the appropriate messaging associated with the applications 105, the application gateway AG communicates with the data sources 106 through various protocols (such as but not limited to HTTP, SQL, and component API) for exposing relevant business logic (methods) to the applications 105 once provisioned on the devices 100. The applications 105 can use the business logic of the data sources 106 similarly to calling a method on an object (or a function). It is recognized that the applications 105 can be downloaded/uploaded in relation to data sources 106 via the network 102 and application gateway AG directly to the devices 100. For example, the application gateway AG is coupled to a provisioning server 108 and a discovery server 110 for providing a mechanism for optimized over-the-air provisioning of the applications 105, including capabilities for application 105 discovery from the device 100 as listed in a UDDI (for example) registry 112. The Registry 112 can be part of the Discovery Service implemented by the server 110, and the registry 112 is used for publishing the applications 105. The application 105 information in the registry 112 can contain such as but not limited to a Deployment Descriptor DD (contains information such as application 105 name, version, and description) as well as the location of this application 105 in an application repository 114.

Referring again to FIG. 1, for initialization of the runtime environment RE, the RE receives the gateway AG URL and the gateway AG public key in a MDS 115 service book. The runtime environment RE uses this information to connect to the gateway AG for initial handshaking. Device 100 provisioning or BES 116, depending on the domain, pushes the MDS 115 service book to the device 100. It is recognised there could be more than one gateway AG in the network 10, as desired. Once initialized, access to the applications 105 by the devices 100, as downloaded/uploaded, can be communicated via the gateway AG directly from the application repository 114, and/or in association with data source 106 direct access (not shown) to the repository 114.

Application Design User Interface or Tool 116

Referring to FIG. 1, the applications 105 can be stored in the repository 114 as a series of packages that can be created by a Studio developer tool 116, which is employed by developers of the applications 105. The developer design tool 116 can be a RAD tool used to develop the Wired and/or Wireless Component Application 105 packages (or "applications"). The tool 116 can provide support for a drag- and drop graphical approach for the visual design of application 105 components (see FIG. 4) such as but not limited to screens 402, data elements 400, messages 404 and application workflow logic 406, as further defined below. The application 105 packages are represented as metadata (XML) that can be generated automatically by the tool 116 through an automatic code generation process. This tool 116 can provide for the automatic generated code to include or be otherwise augmented by an industry standard scripting language (e.g. JavaScript™) or other scripting/programming languages known in the art. The availability of the application 105 packages of the repository 114 are published via the discovery service of the server 110 in the registry 112. It is recognized that there can be more than one repository 114 and associated registries 112 as utilized by the particular network 10 configuration of the application gateway AG and associated data sources 106.

Figure 2:
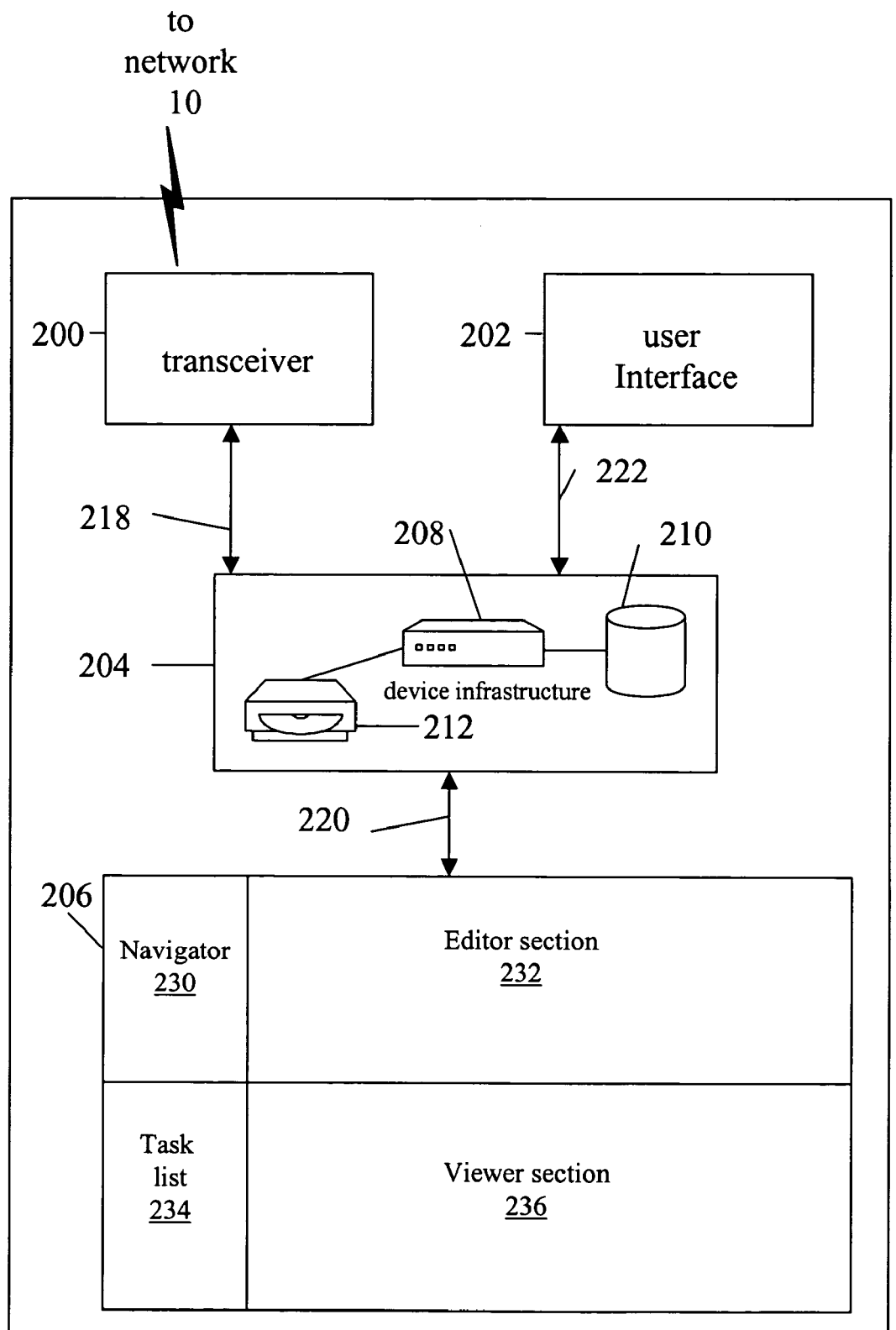
FIG. 2 is a block diagram of a tool for developing and generating the applications of FIG. 1.

Referring to FIG. 2, the tool 116 is operated on a computer 201 that can be connected to the network 10 via a network connection interface such as a transceiver 200 coupled via connection 218 to a device infrastructure 204. The transceiver 200 can be used to upload completed application programs 105 to the repository 114 (see FIG. 1), as well as access the registry 112 and selected data sources 106. Referring again to FIG. 2, the developer design tool 116 also has a user interface 202, coupled to the device infrastructure 204 by connection 222, to interact with a user (not shown). The user interface 202 includes one or more user input devices such as but not limited to a keyboard, a keypad, a trackwheel, a stylus, a mouse, a microphone, and is coupled to a user output device such as a speaker (not shown) and a screen display 206. If the display 206 is touch sensitive, then the display 206 can also be used as the user input device as controlled by the device infrastructure 204. The user interface 202 is employed by the user of the tool 116 to coordinate the design of applications 105 using a series of editors 600 and viewers 602 (see FIG. 6).

Referring again to FIG. 2, operation of the tool computer 201 is enabled by the device infrastructure 204. The device infrastructure 204 includes a computer processor 208 and the associated memory module 210. The computer processor 208 manipulates the operation of the network interface 200, the user interface 202 and the display 206 of the tool 116 by executing related instructions, which are provided by an operating system and application 105 design editors 600 and viewers 602 resident in the memory module 210. Further, it is recognized that the device infrastructure 204 can include a computer readable storage medium 212 coupled to the processor 208 for providing instructions to the processor and/or to load/design the applications 105 also resident (for example) in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, the design tool 116 is operated on the computer 201 as an application development environment for developing the applications 105 or applications. The development methodology of the tool 116 can be based on a visual "drag and drop" system of building the application visual, data, messaging behaviour, and runtime navigation model. The tool 116 can be structured as a set of plug-ins to a generic integrated design environment (IDE) framework, such as but not limited to the Eclipse framework, or the tool 116 can be configured as a complete design framework without using plug-in architecture. For exemplary purposes only, the tool 116 will now be described as a plug-in design environment using the Eclipse framework.

Figure 6:
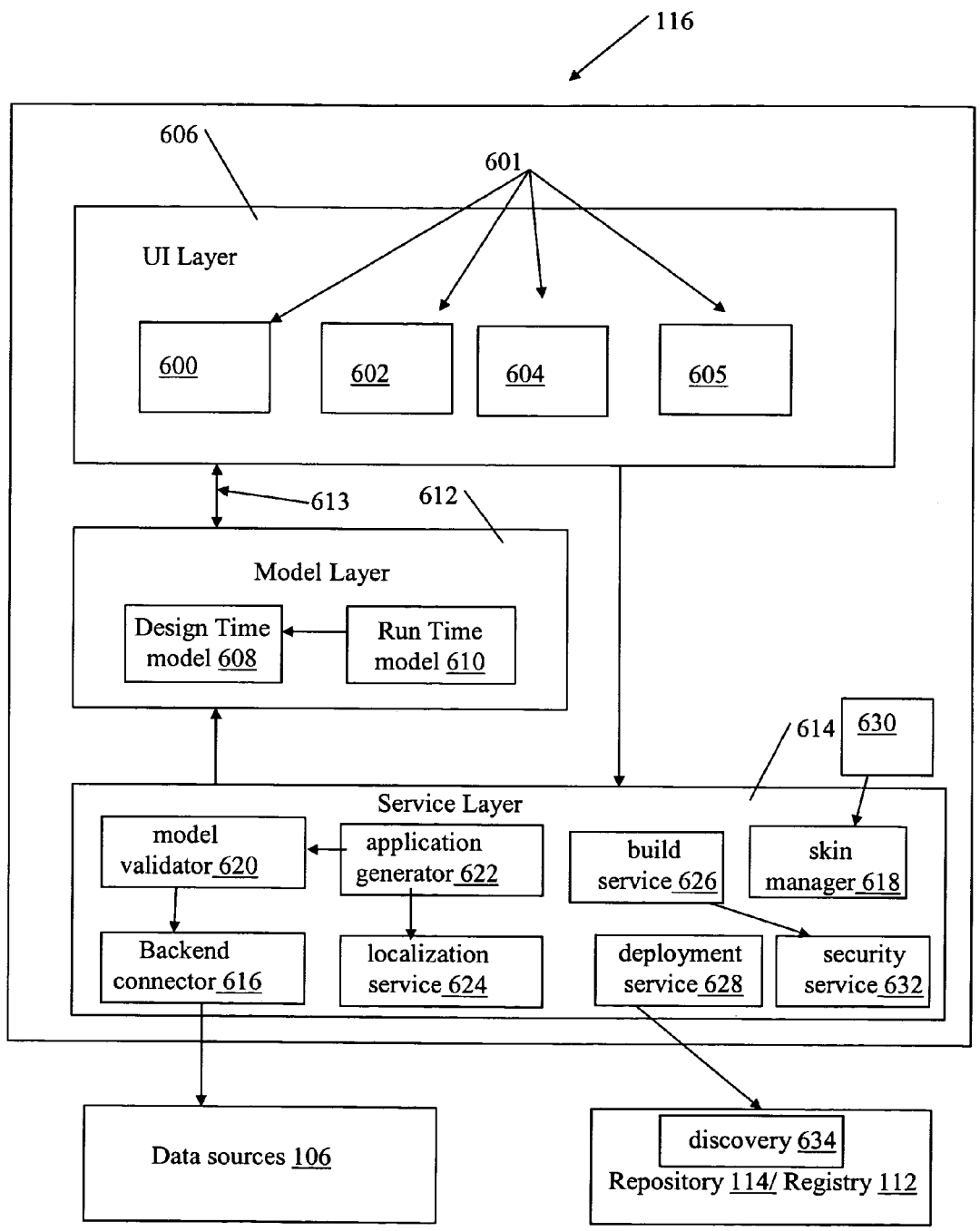
FIG. 6 is a block diagram of the tool architecture of FIG. 2.

Referring to FIGS. 2 and 6, Eclipse makes provisions for a basic, generic tool 116 environment that can be extended to provide custom editors, wizards, project management and a host of other functionality. The Eclipse Platform is designed for building integrated development environments (IDEs) that can be used to create applications as diverse as web sites, embedded Java™ programs, C++ programs, and Enterprise JavaBeans™. The navigator view 230 shows files in a user's (e.g. developer) workspace; a text editor section 232 shows the content of a file being worked on by the user of the tool 116 to develop the application 105 and associated components 400,402,404,406 (see FIG. 4) in question; the tasks view section 234 shows a list of to-dos for the user of the tool 116; and the outline viewer section 236 shows for example a content outline of the application 105 being designed/edited, and/or may augment other views by providing information about the currently selected object such as properties of the object selected in another view. It is recognised that the tool 116 aids the developer in creating and modifying the coded definition content of the components 400,402,404 in the structured definition language (e.g. in XML). Further, the tool 116 also aids the developer in creating, modifying, and validating the interdependencies of the definition content between the components 400,402,404, such as but not limited to message/data and screen/data relationships.

The Eclipse Platform is built on a mechanism for discovering, integrating, and running modules called plug-ins (i.e. editors 600 and viewers 602). When the Eclipse Platform is launched via the UI 202 of the computer 201, the user is presented with an integrated development environment (IDE) on the display 206 composed of the set of available plug-ins, such as editors 600 and viewers 602. The various plug-ins to the Eclipse Platform operate on regular files in the user's workspace indicated on the display 206. The workspace consists of one or more top-level projects, where each project maps to a corresponding user-specified directory in the file system, as stored in the memory 210 (and/or accessible on the network 10), which is navigated using the navigator 230. The Eclipse Platform UI paradigm is based on editors, views, and perspectives. From the user's standpoint, a workbench display 206 consists visually of views 602 and editors 600. Perspectives manifest themselves in the selection and arrangements of editors 600 and views 602 visible on the display 206. Editors 600 allow the user to open, edit, and save objects. The editors 600 follow an open-save-close lifecycle much like file system based tools. When active, a selected editor 600 can contribute actions to a workbench menu and tool bar. Views 602 provide information about some object that the user is working with in the workbench. A viewer 602 may assist the editor 600 by providing information about the document being edited. For example, viewers 602 can have a simpler lifecycle than editors 600, whereby modifications made in using a viewer 602 (such as changing a property value) are generally saved immediately, and the changes are reflected immediately in other related parts of the display 206. It is also recognised that a workbench window of the display 206 can have several separate perspectives, only one of which is visible at any given moment. Each perspective has its own viewers 602 and editors 600 that are arranged (tiled, stacked, or detached) for presentation on the display 206.

Component Applications 105

Figure 3:
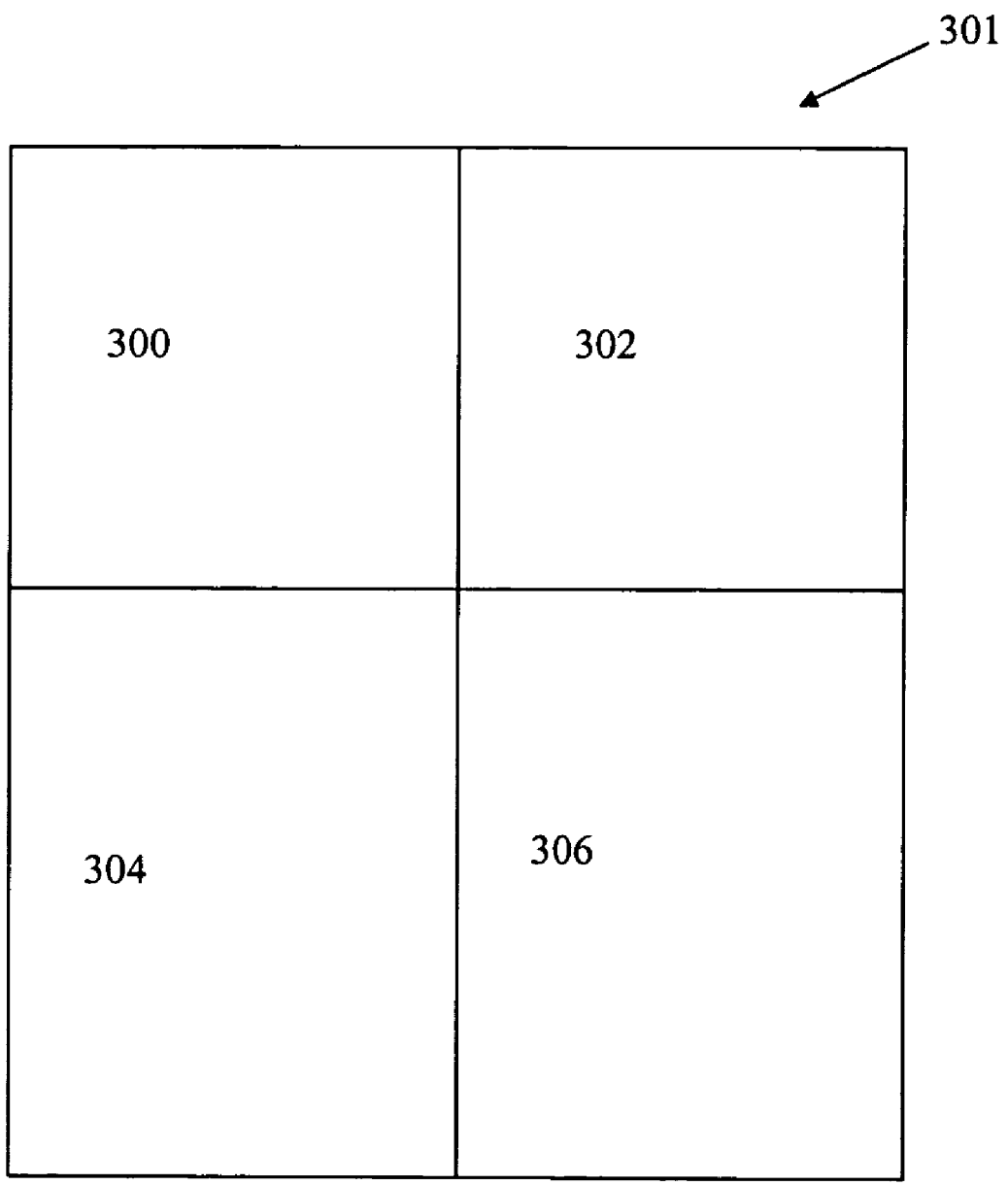
FIG. 3 is a block diagram of a component application package of FIG. 1.

Referring to FIG. 3, the application 105 packages have application elements or artifacts 301 such as but not limited to XML definitions 300, mappings 302, application resources 304, and optionally resource bundle(s) 306 for localization support. XML definitions 300 are XML coding of application data 400, messages 404, screens 402 components and workflow 406, part of the raw application 105. It is recognised that XML syntax is used only as an example of any structured definition language applicable to coding of the applications 105. Application mapping 302 defines the relationship of content in the application messaging to backend operation of the data sources 106. The application developer creates the mappings 302 using the tool 116, whereby the gateway AG utilizes this mapping 302 information during communication of the application 105 request/response messages between the runtime RE, of the devices 100, and the data sources 106. The resources 304 are one or more resources (images, soundbytes, media, etc. . . . ) that are packaged with the application 105 as static dependencies. For example, resources 304 can be located relative to a resources folder (not shown) such that a particular resource may contain its own relative path to the main folder (e.g. resources/icon.gif, resources/screens/clipart_1.0/happyface.gif, and resources/soundbytes/midi/inthemood.midi). The resource bundles 306 can contain localization information for each language supported by the application 105. These bundles can be locatred in a locale folder, for example, and can be named according to the language supported (e.g. locale/lang_en.properties and locale/lang_fr.properties). An example of the elements 301 are given below.

It is recognised that the runtime environment RE of the device 100 is the client-resident container within which the applications 105 are executed on the device 100. The container manages the application 105 lifecycle on the device 100 (provisioning, execution, deletion, etc.) and is responsible for translating the metadata (XML) representing the application 105 into an efficient executable form on the device 100. The application 105 metadata is the executable form of the XML definitions 300, as described above, and is created and maintained by the runtime environment RE. The RE can provide a set of common services to the application 105, as well as providing support for optional JavaScript™ or other scripting languages. These services include support for such as but not limited to UI control, data persistence and asynchronous client-server messaging. It is recognised that these services could also be incorporated as part of the application 105, if desired.

Figure 4:
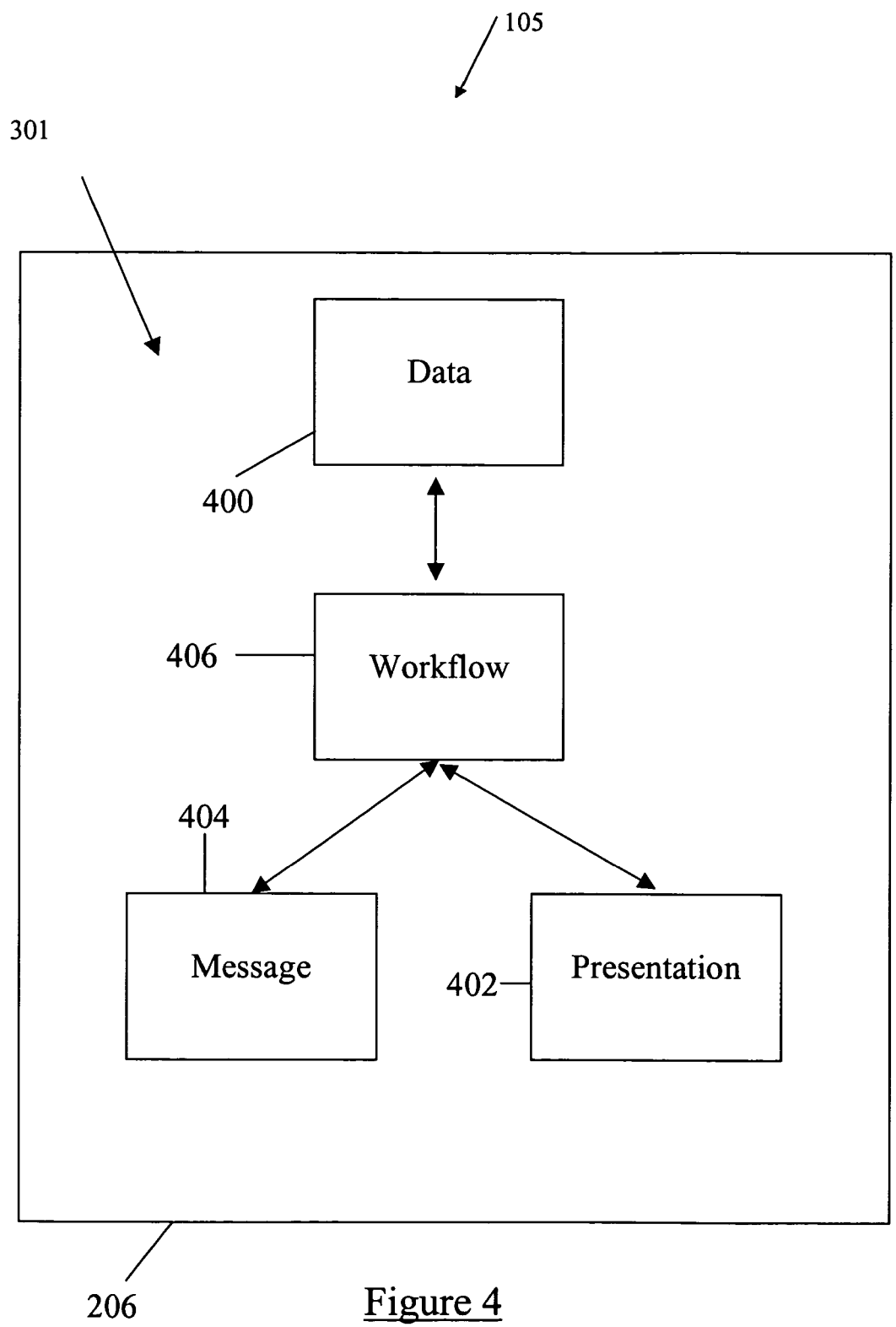
FIG. 4 is a block diagram illustrating example components of the application of FIG. 3.

Referring to FIG. 4, the component applications 105 are software applications which can have artifacts 301 written, for example, in eXtensible Markup Language (XML) and a subset of ECMAScript. XML and ECMAScript are standards-based languages which allow software developers to develop the component applications 105 in a portable and platform-independent way. A block diagram of the component application 105 comprises the data components 400, the presentation components 402 and the message components 404, which are coordinated by workflow components 406 through interaction with the client runtime environment RE of the device 100 (see FIG. 1) once provisioned thereon. The structured definition language (e.g. XML) can be used to construct the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 400, 402, 404 to be processed by the runtime environment RE (see FIG. 1), and encoding schemes include schemes such as but not limited to XML, HTML, XHTML, XSML, RDF, Machine Readable Cataloging (MARC), and Multipurpose Internet Mail Extensions (MIME). The client runtime environment RE of the device 100 operates on the metadata descriptors of the components 400, 402, 404 to provision an executable version of the application 105.

Referring again to FIG. 4, the data components 400 define data entities which are used by the component application 105. Data components 400 define what information is required to describe the data entities, and in what format the information is expressed. For example, the data component 400 may define information such as but not limited to an order which is comprised of a unique identifier for the order which is formatted as a number, a list of items which are formatted as strings, the time the order was created which has a datetime format, the status of the order which is formatted as a string, and a user who placed the order which is formatted according to the definition of another one of the data components 400.

Referring again to FIG. 4, the message components 404 define the format of messages used by the component application 105 to communicate with external systems such as the web service. For example, one of the message components 404 may describe information such as but not limited to a message for placing an order which includes the unique identifier for the order, the status of the order, and notes associated with the order. It is recognised that data definition content of the components can be shared for data 400 and message 404 components that are linked or otherwise contain similar data definitions.

Referring again to FIG. 4, the presentation components 402 define the appearance and behavior of the component application 105 as it is displayed by a user interface of the devices 100. The presentation components 402 can specify GUI screens and controls, and actions to be executed when the user interacts with the component application 105 using the user interface. For example, the presentation components 402 may define screens, labels, edit boxes, buttons and menus, and actions to be taken when the user types in an edit box or pushes a button. It is recognised that data definition content of the components can be shared for data 400 and presentation 402 components that are linked or otherwise contain similar data definitions.

Referring to FIGS. 1 and 4, it is recognized that in the above described client component application 105 definitions hosting model, the presentation components 402 may vary depending on the client platform and environment of the device 100. For example, in some cases Web Service consumers do not require a visual presentation. The application definition of the components 400, 402, 404, 406 of the component application 105 can be hosted in the Web Service repository 114 as a package bundle of platform-neutral data 400, message 404, workflow 406 component descriptors with a set of platform-specific presentation component 402 descriptors for various predefined client runtimes RE. When the discovery or deployment request message for the application 105 is issued, the client type would be specified as a part of this request message. In order not to duplicate data, message, and workflow metadata while packaging component application 105 for different client platforms of the communication devices 100, application definitions can be hosted as a bundle of platform-neutral component definitions linked with different sets of presentation components 402. For those Web Service consumers, the client application 105 would contain selected presentation components 402 linked with the data 400 and message 404 components through the workflow components 406.

Referring again to FIG. 4, the workflow components 406 of the component application 105 define processing that occurs when an action is to be performed, such as an action specified by a presentation component 402 as described above, or an action to be performed when messages arrive from the application gateway AG (see FIG. 1). Presentation, workflow and message processing are defined by the workflow components 406. The workflow components 406 are written as a series of instructions in a programming language (e.g. object oriented programming language) and/or a scripting language, such as but not limited to ECMAScript, and can be (for example) compiled into native code and executed by the runtime environment 206, as described above. An example of the workflow components 406 may be to assign values to data, manipulate screens, or send the message 105. As with presentation components, multiple workflow definitions can be created to support capabilities and features that vary among devices 100. ECMA (European Computer Manufacturers Association) Script is a standard script language, wherein scripts can be referred to as a sequence of instructions that is interpreted or carried out by another program rather than by the computer processor. Some other example of script languages are Perl™, Rexx™, VBScript™, JavaScript™, and Tcl/Tk. The scripting languages, in general, are instructional languages that are used to manipulate, customize, and automate the facilities of an existing system, such as the devices 100.

Referring to FIG. 4, the application 105 is structured using component architecture such that when the device 100 (see FIG. 1) receives a response message from the application gateway AG containing message data, the appropriate workflow component 406 interprets the data content of the message according to the appropriate message component 404 definitions. The workflow component 406 then processes the data content and inserts the data into the corresponding data component 400 for subsequent storage in the device 100.

Further, if needed, the workflow component 406 also inserts the data into the appropriate presentation component 402 for subsequent display on the display of the device 100. A further example of the component architecture of the applications 105 is for data input by a user of the device 100, such as pushing a button or selecting a menu item. The relevant workflow component 406 interprets the input data according to the appropriate presentation component 404 and creates data entities which are defined by the appropriate data components 400. The workflow component 406 then populates the data components 400 with the input data provided by the user for subsequent storage in the device 100. Further, the workflow component 406 also inserts the input data into the appropriate message component 404 for subsequent sending of the input data as data entities to the data source 106, web service for example, as defined by the message component 404.

The following example, referring to FIG. 4, shows how a Web Services client application 105 could be expressed using a structured definition language, such as but not limited to XML, and a platform neutral scripting/programming language, such as but not limited to ECMAScript, with defined components conforming with the following Document Type Definition (DTD):

```
<!ELEMENT wcApp (desc?, iconUrl?, res*, wcData*,
    wcMsg*, style*, wcScr*, wcFlow)>
<!ATTLIST wcApp
    name CDATA #REQUIRED
    title CDATA #IMPLIED
    vendor CDATA #IMPLIED
    version CDATA #IMPLIED
    transportKey CDATA #IMPLIED
    installNotifURL CDATA #IMPLIED
    registerURL CDATA #IMPLIED
>
<!ELEMENT desc (#PCDATA)>
<!ELEMENT iconUrl (#PCDATA)>
<!ELEMENT res (#PCDATA)>
<!ATTLIST res
    name CDATA #REQUIRED
    url CDATA #REQUIRED
    type (xml | image | sound | any) #REQUIRED
    deferred (true | false) "false"
>
Example Data Component 400
<!ELEMENT wcData (dfield+)>
<!ATTLIST wcData
    name CDATA #REQUIRED
    persisted (true | false) "true"
>
<!ELEMENT dfield (#PCDATA)>
<!ATTLIST dfield
    name CDATA #REQUIRED
    type (String | Number | Boolean | Date | Any) "Any"
    array (true | false) "false"
    cmp (true | false) "false"
    cmpName CDATA #IMPLIED
    key (0 | 1 | 2) "0"
>
Example Message Component 404
<!ELEMENT wcMsg (mfield*)>
<!ATTLIST wcMsg
    name CDATA #REQUIRED
    mapping CDATA #IMPLIED
>
<!ATTLIST wcMsg
    pblock CDATA #IMPLIED
>
<!ELEMENT mfield (#PCDATA)>
<!ATTLIST mfield
    name CDATA #REQUIRED
    type (String | Number | Boolean | Date | Array |
        XML) #IMPLIED
    mapping CDATA #IMPLIED
```

-continued

Example Presentation Components 402

"The Example Presentation Components 402 has been submitted as a text file entitled "11078331_0.txt" in a computer program listing appendix on a compact disc. The information and/or data contained therein is incorporated by reference in its entirety."

>

Example Workflow Component 406
<!ELEMENT wcFlow (pblock+)>
<!ELEMENT pblock (#PCDATA)>
<!ATTLIST pblock id CDATA #REQUIRED
param CDATA #IMPLIED
>

Figure 5:
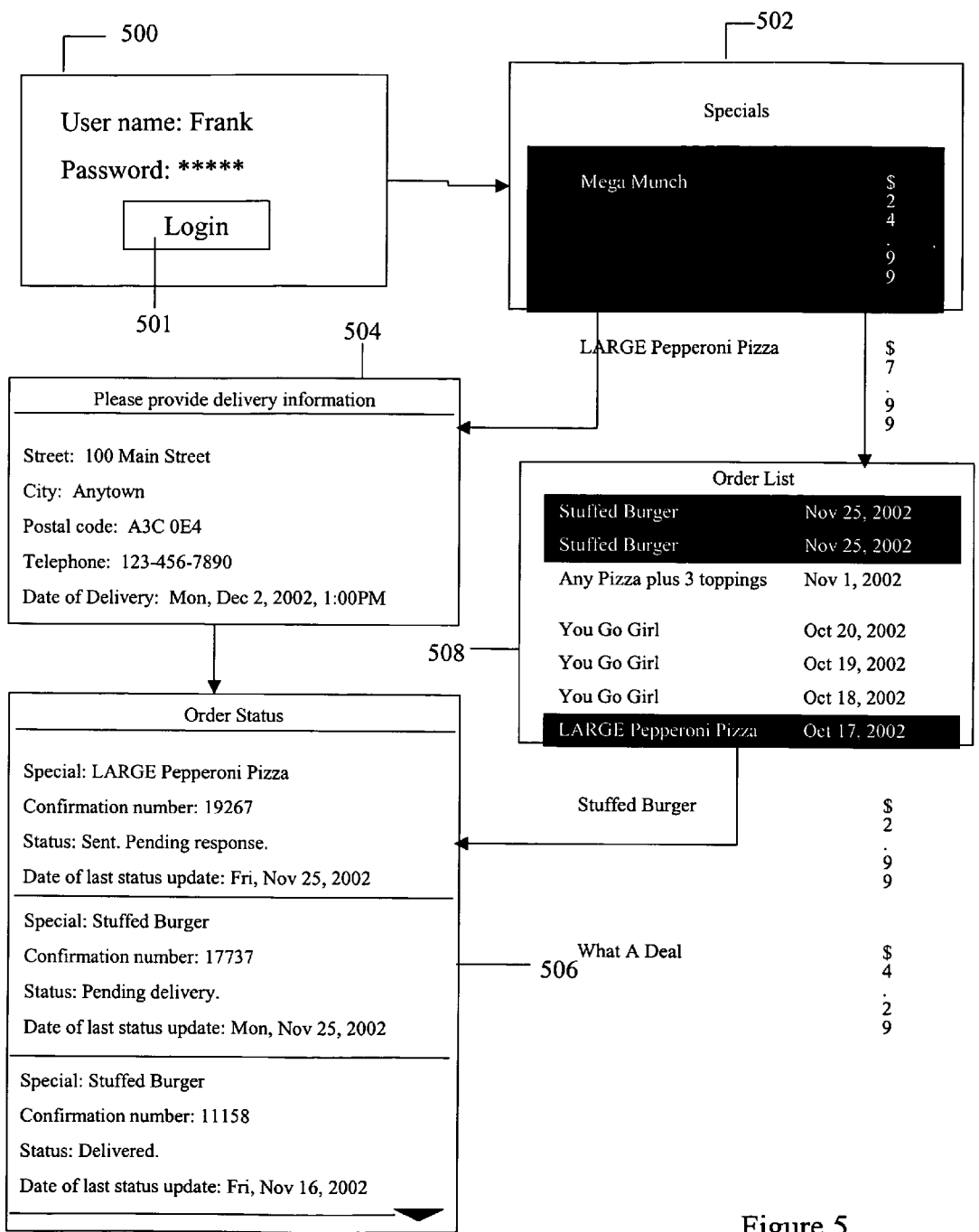
FIG. 5 shows example screens and workflow for a sample component application of FIG. 3.

The example component application program 105 displayed in FIG. 5 is represented in XML and mEScript as submitted as a text file entitled "11078331_1.txt" in a computer program listing appendix on a compact disc, including data components 400 as "wcData", message components 404 as "wcMsg", presentation components 402 as "wcScr" and workflow components 406 as "wcFlow" for processing the other components 400, 402, 404. The information and/or data contained 11078331_1.txt is incorporated by reference in its entirety.

```
<!DOCTYPE wcApp SYSTEM "wcApp.dtd">
<wcApp name="WirelessPizza" title="Wireless Pizza" vendor="ARG" version="0.9">
    <desc> Order pizza from your wireless device. </desc>
    <iconUrl>http://www.example.com/wirelessPizzaIcon.png</iconUrl>
    <wcData name="User">
        <dfield name="name" type="String" key="1"/>
        <dfield name="passwordHash" type="String"/>
        <dfield name="street" type="String"/>
        <dfield name="city" type="String"/>
        <dfield name="postal" type="String"/>
        <dfield name="phone" type="String"/>
    </wcData>
    <wcData name="OrderStatus">
        <dfield name="confNumber" type="Number" key="1"/>
        <dfield name="status" type="String"/>
        <dfield name="datetime" type="Date"/>
    </wcData>
    <wcData name="Order">
        <dfield name="orderId" type="Number" key="1"/>
        <dfield name="special" type="String"/>
        <dfield name="user" cmp="true" cmpName="User"/>
        <dfield name="datetime" type="Date"/>
        <dfield name="orderStatus" cmp="true" cmpName="OrderStatus"/>
    </wcData>
    <wcData name="Special">
        <dfield name="desc" key="1" type="String"/>
        <dfield name="price" type="Number"/>
    </wcData>
    <wcMsg name="inAddSpecial" mapping="Special">
    </wcMsg>
    <wcMsg name="inRemoveSpecial" pblock="mhRemoveSpecial">
        <mfield name="desc" mapping="Special.desc"/>
    </wcMsg>
    <wcMsg name="inOrderStatus">
        <mfield name="orderId" mapping="Order.orderId"/>
        <mfield name="status" mapping="Order.orderStatus"/>
    </wcMsg>
    <wcMsg name="inUserInfo" mapping="User">
    </wcMsg>
    <wcMsg name="outOrder">
        <mfield name="special" mapping="Order.special"/>
        <mfield name="user" mapping="Order.user"/>
        <mfield name="datetime" mapping="Order.datetime"/>
    </wcMsg>
    <wcScr name="scrSpecials" title="Specials" main="true">
        <layout type="flow">
            <choice name="slSpecials" value="Special[ ].desc + '- $' + Special[ ].price" type="singleList"/>
        </layout>
        <menu>
            <item name="login" label="Login">
                <action screen="scrLogin"/>
                <condition pblock="chLoggedin" result="false"/>
            </item>
            <item name="order" label="Order">
                <action screen="scrDelivery" param="Application.authenticatedUser"/>
                <condition pblock="chLoggedin"/>
            </item>
```

```xml
            <item name="viewOrderStatus" label="View Orders Status">
                <action screen="scrOrdersList"/>
                <condition pblock="chLoggedin"/>
            </item>
        </menu>
    </wcScr>
    <wcScr name="scrLogin" dialog="true">
        <layout type="vertical">
            <layout type="flow">
                <label name="lblUserName" value="User Name:"/>
                <edit name="edUserName" type="char"/>
            </layout>
            <layout type="flow">
                <label name="lblPassword" value="Password:"/>
                <edit name="edPassword" type="pwd"/>
            </layout>
            <button name="btnLogin" label="Login">
                <event type="onClick" pblock="ahLogin" param="edUserName.value"/>
            </button>
        </layout>
    </wcScr>
    <wcScr name="scrDelivery" title="Please provide delivery information" param="User">
        <layout type="vertical">
            <layout type="flow">
                <label name="lblStreet" value="Street:"/>
                <edit name="street" mapping="User.street" type="char"/>
            </layout>
            <layout type="flow">
                <label name="lblCity" value="City:"/>
                <edit name="city" mapping="User.city" type="char"/>
            </layout>
            <layout type="flow">
                <label name="lblPostalCode" value="Postal code:"/>
                <edit name="postalCode" mapping="User.postal" type="char"/>
            </layout>
            <layout type="flow">
                <label name="lblPhone" value="Telephone:"/>
                <edit name="phone" mapping="User.phone" type="phone"/>
            </layout>
            <layout type="flow">
                <label name="lblDate" value="Date of delivery:"/>
                <edit name="date" type="date"/>
            </layout>
        </layout>
        <menu>
            <item name="sendOrder" label="Send Order">
                <action pblock="ahSendOrder" param="User"/>
            </item>
        </menu>
    </wcScr>
    <wcScr name="scrOrderStatus" title="Order status" param="Order[ ]">
        <layout type="vertical" param="%">
            <layout type="flow">
                <label name="lblSpecialr" value="Special:"/>
                <label name="lblSpecialMapped" value="@Order[ ].special"/>
            </layout>
            <layout type="flow">
                <label name="lblConfNumber" value="Confirmation number:"/>
                <label name="lblConfNumberMapped" value="@Order[ ].orderStatus.confNumber"/>
            </layout>
            <layout type="flow">
                <label name="lblStatus" value="Status:"/>
                <label name="lblStatusMapped" value="@Order[ ].orderStatus.status"/>
            </layout>
            <layout type="flow">
                <label name="lblConfDate" value="Date of last status update:"/>
                <label name="lblConfDateMapped" value="@Order[ ].orderStatus.datetime"/>
            </layout>
            <separator/>
        </layout>
        <menu>
            <item name="continue" label="Continue">
                <action screen="scrSpecials"/>
            </item>
        </menu>
        <refresh>
            <msg> inOrderStatus </msg>
        </refresh>
```

```
        </wcScr>
        <wcScr name="scrOrdersList" title="Previous Orders">
            <layout type="vertical">
                <label name="lblInstructions" value="Select one or more order:"/>
                <choice name="mlOrderList" value="@Order[ ].datetime + ' - ' + @Order[ ].special"
mapping="Order[ ]" type="multiList"/>
            </layout>
            <menu>
                <item name="viewOrder" label="View Order">
                    <action screen="scrOrderStatus" param="mlOrderList.selected"/>
                </item>
            </menu>
        </wcScr>
        <wcFlow>
            <pblock id="chLoggedin">
                return Application.authenticatedUser != null;
            </pblock>
            <pblock id="ahLogin" param="User.name">
                if(User.passwordHash == Util.md5(scrLogin.edPassword) ) {
                    Application.authenticatedUser = User;
                    scrLogin.back( ) ;
                } else {
                Dialog.display("Invalid login!");
                }
            </pblock>
            <pblock id="ahSendOrder" param="User">
                Order.orderId = Util.guid( ) ;
                Order.special = scrSpecials.slSpecials.selected;
                Order.user = User;
                Order.datetime = scrDelivery.date;
                OrderStatus.confNumber = Util.guid( ) ;
                OrderStatus.status = "Sent. Pending response.";
                OrderStatus.date = Util.currentDate( ) ;
                Order.orderStatus = OrderStatus;
                outOrder.send( ) ;
                scrOrderStatus.display(Order);
            </pblock>
            <pblock id="mhRemoveSpecial" param="inRemoveSpecial">
                Special.desc = inRemoveSpecial.desc;
                Special.delete( ) ;
            </pblock>
        </wcFlow>
</wcApp>
```

As given above, the XML elements define the example component application 105 including a wcApp element, a wcData element, a wcMsg element, a wcSrc element, and a wcFlow element. Referring to FIG. 4, the wcApp element is a top-level element which defines the component application 105. The wcData element defines the example data component 400, which is comprised of a group of named, typed fields. The wcMsg element defines the example message component 404, which similarly defines a group of named, typed fields. The wcSrc element defines the example presentation component 402. The example presentation component 402 is a label, a separator, an image, a button, an edit field, a text area, a single-selection list, a multi-selection list, a drop-list, a checkbox, a radio button, or a screen containing a group of other presentation components 402. The presentation components 402 included in the example component application 105 define a login screen 500, a specials screen 502, a delivery information screen 504, an order list screen 508, and an order status screen 506. These screens would be presented on the user interface of the device 100. The wcFlow element defines the example workflow components 406. The pblock attributes of the XML elements specify a pblock element nested in the wcFlow element. Each pblock element comprises script which defines part of the workflow of the component application 105. The script is written in ECMAScript by way of example only.

In order to define the behavior of the component application 105, the workflow components 406 use ECMAScript to reference and manipulate the data components 400, the presentation components 402, and the message components 404. Workflow components 406 can also reference external object types, which allow actions to be performed on the components defined in the component application 105. For example, a wcMsg type allows a message defined by a message component 404 to be evaluated to determine whether mandatory fields have been supplied, and to be sent to an external system such as the web service 106. A wcData type allows the size of collections of data entities defined by data components 400 to be determined, and allows data entities to be deleted. A wcScr type allows a presentation component 402 to be displayed to the user. Similarly, a special dialog external object allows a message to be displayed to the user on the user interface of the device 100. The message components 404 relay the required data for the input and output of the messages of the application 105. The corresponding data components 400 coordinate the storage of the data in memory of the device 100 for subsequent presentation on the user interface by the presentation components 402. The workflow components 406 coordinate the transfer of data between the data 400, presentation 402, and message 404 components. The workflow components 406 are written as a series of instructions, such as but not limited to ECMAScript, which is described above.

The above described component based application 105 architecture can result in component applications 105 in which the user-interface of the device 100 and the definition of the data are decoupled. This decoupling allows for modification of any component 400, 402, 404, 406 in the component application 105 while facilitating insubstantial changes to other components 400, 402, 404, 406 in the application 105, and thus can facilitate maintenance of the component applications 105, including modification and updating of the component applications 105 on the device 100.

Designer Tool 116 Architecture

FIG. 6 illustrates the overall designer tool 116 structure for designing component applications 105. The designer tool 116 interface (UI 202 and display 206—see FIG. 2) is primarily a user facing module 601 collection of graphical and text editors 600, viewers 602, dialogs 605 and wizards 604. The large majority of external interactions are accomplished through one or more of these editors 600, with the developer/user, using a system of drag and drop editing and wizard driven elaboration. The secondary and non-user facing system interface is that of the "Backend", whereby the tool 116 connects to and digests datasource 106 services such as Web Services and SQL Databases. As described above, the tool 116 can be built on the Eclipse platform, whereby the user interface system components can be such as but not limited to components of editors 600, viewers 602, dialogs (not shown) and wizards 604, which are plug-in modules 601 that extend Eclipse classes and utilize the Eclipse framework, for example. As shown, the tool 116 communicates with backend data sources 106 and UDDI repositories 114 and registries 112. These external systems 106, 112, 114 may not be part of the tool 116 but are shown for completeness.

The tool 116 has a UI Layer 606 composed mainly of the editors 600 and viewers 602, which are assisted through the workflow wizards 605. The layer 606 has access to an extensive widget set and graphics library known as the Standard Widget Toolkit (SWT), for Eclipse. The UI layer 606 modules 601 can also make use of a higher-level toolkit called JFace that contains standard viewer classes such as lists, trees and tables and an action framework used to add commands to menus and toolbars. The tool 116 can also use a Graphical Editing Framework (GEF) to implement diagramming editors such as the Workflow Editor 702 and the Relationship Editor 704 (see FIG. 7). The UI layer 606 modules 601 can follow the Model-View-Controller design pattern where each module 601 is both a view and a controller. Data models 608,610 represents the persistent state of the application 105 and are implemented in the data model layer 612 the tool 116 architecture. The separation of the layers 606, 612 keeps presentation specific information in the various views and provides for multiple UI modules 601 (e.g. editors 600 and viewers 602) to respond to data model 608,610 changes.

The tool 116 data models 608,610 can be based on the Eclipse Modeling Framework (EMF). EMF is a framework and code generation facility. The framework provides model 608,610 change notification, persistence support and an efficient reflective API for manipulating EMF objects generically. The code generation facility is used to generate the model 608,610 implementation and create adapters to connect the model layer 612 with the user interface modules 601 of the UI layer 606.

A tool 116 service layer 614 provides facilities for the UI layer 606 such as validation 620, localization 624, generation 622, build 626 and deployment 628, further described below. The tool 116 can make use of the Eclipse extension point mechanism to load additional plug-ins for two types of services: backend connectors 616 and device skin managers 618 with associated presentation environments 630.

The backend connector 616 defines an Eclipse extension point to provide for the tool 116 to communicate with or otherwise obtain information about different backend data sources 106, in order to obtain the message format of the selected data source 106. The backend connector 616 can be used as an interface to connect to and to investigate backend datasource 106 services such as Web Services and SQL Databases. The backend connector 616 facilitates building a suitable application message and data set to permit communication with these services from the application 105 when running on the device. The backend connector 616 can support the access to multiple different types of data sources 106, such as but not limited to exposing respective direct communication interfaces through a communication connector based architecture. At runtime the tool 116 reads the plug-in registry to add contributed backend extensions to the set of backend connectors 616, such as but not limited to connectors for Web Services.

The Backend Connector 616 can be responsible for such as but not limited to: connecting to a selected one (or more) of the backend data sources 106 (e.g. WebService, Database); providing an interface for accessing the description of the backend data source 106 (e.g. messages, operations, datatypes); and/or providing for the identification of Notification services (those which push notifications over the network 10 to the device 100—see FIG. 1). The Backend Connector 616 can provide an interface to the backend datasource 106 (e.g. a web service, SQL Database or other) for access of the data source description, and can provide a level of abstraction between implementation specific details of the backend messaging and generic messaging descriptions 302 maintained by the Design Time Data Model 608. For example, the Backend Connector 616 can be used to generate appropriate messaging 404 and data 400 component sets for the application 105, and is used by the Model Validator 620 as part of validation tasks to verify the sanity of existing message mapping 302 relationships in the application 105 under development. For example, the backend connector 616 can be implemented as an interface using an API call as the protocol to access the underlying backend data source 106 (e.g. using a WSDL Interface for WebServices)

The device skin manager 618 defines an Eclipse extension point, for example, to allow the tool 116 to emulate different devices 100 (see FIG. 1), such that the look and feel of different target devices 100 (of the application 105) can be specified. At runtime the tool 116 reads the plug-in registry to add contributed skin extensions or presentation environments 630 to the set of device environments 630 coordinated by the manager 618, such as but not limited to environments 630 for a generic BlackBerry™ or other device 100. The Skin Manager 618 is used by the Testing/Preview viewer 806 to load visual elements (as defined by the screen component 402 of the data model 608,610) that look appropriate for the device 100 that is being emulated, i.e. elements that are compatible with the specified environment 630. Different skins or presentation environments/formats 630 are "pluggable" into the manager 618 of the tool 116, meaning that third parties can implement their own presentation environments 630 by creating new unique SkinIds (an Eclipse extension point), for example, and implementing an appropriate interface to create instances of the screen elements supported by the runtime environment RE of the emulated device 100. In order to load a new presentation environment 630, the Testing/Preview viewer 806 first asks the Manager 618 for an instance of the specified environment 630. The Manager 618 then instantiates the environment 630 and the Testing/Preview viewer 806 uses the specified environment 6320 to construct the screen elements according to the screen components 402 of the model 608,610. For example, the presentation environments 630 (e.g. SkinPlugins) are identified to the SkinManager 618 through a custom Eclipse extension point using the Eclipse framework.

Referring to FIG. 6, the UI Layer 606 is comprised of the set of editors 600, viewers 602, wizards 604 and dialogs 605. The UI Layer 606 uses the Model-View-Controller (MVC) pattern where each UI module 601 is both a View and a Controller. UI Layer modules 601 interact with the data models 608,610 with some related control logic as defined by the MVC pattern. The editors 600 are modules 601 that do not commit model 608,610 changes until the user of the tool 116 chooses to "Save" them. An example of an editor 600 is the Script Editor 706 (see FIG. 7), further described below. Viewers 602 are modules 601 that commit their changes to the model 608,612 immediately when the user makes them. An example of a viewer 602 is the Application Navigator (Project View) 802 (see FIG. 8). Wizards 604 are modules 601 that are step-driven by a series of one or more dialogs 605, wherein each dialog 605 gathers certain information from the user of the tool 116 via the user interface 202 (see FIG. 2). No changes are applied to the design time model 608 using the wizards 604 until the user of the tool 116 selects a confirmation button like a "Finish". It is recognised in the example plug-in design tool 116 environment, modules 610 can extend two types of interfaces: Eclipse extension points and extension point interfaces. Extension points declare a unique package or plug-in already defined in the system as the entry point for functional extension, e.g. an editor 600, wizard 604 or project. Extension point interfaces allow the tool 116 to define its own plugin interfaces, e.g. for skins 618 and backend 616 connectors.

Referring again to FIG. 6, modules 601 (primarily Editors 600 and Viewers 602) in the tool 116 are observers of the data models 608,610 and are used to interact or otherwise test and modify the data models 608,610 of the application (e.g. components 400, 402, 404, 406—see FIG. 4) in question. When the data model 608,610 changes, the models 608,610 are notified and respond by updating the presentation of the application 105. The tool 116 uses the Eclipse Modeling Framework (EMF), for example, to connect the Eclipse UI framework to the tool 116 data model 608,610, whereby the modules 601 can use the standard Eclipse interfaces to provide the information to display and edit an object on the display 206 (see FIG. 2). In general, the EMF framework implements these standard interfaces and adapt calls to these interfaces by calling on generated adapters that know how to access the data model 608,610 residing in memory 210. The design time Data Model 608 is the current version of the application 105 in development and is accessed by the users employing the modules 601 to interact with the associated data of the model 608. Modules 601 can also trigger validation actions on the Design Time Data Model 608. Modules 601 can also cause some or all of the application 105 to be generated from the Design Time Data Model 608 resident in memory 210. In general, the Design Time Data Model 608 accepts a set of commands via the UI 202 (see FIG. 2) that affect the state of the model 608, and in response may generate a set of events. Each module 601 (editor 600 and viewer 602) described includes the set of commands and the events that affect the module 601 and data model 608 pairing.

Figure 8:
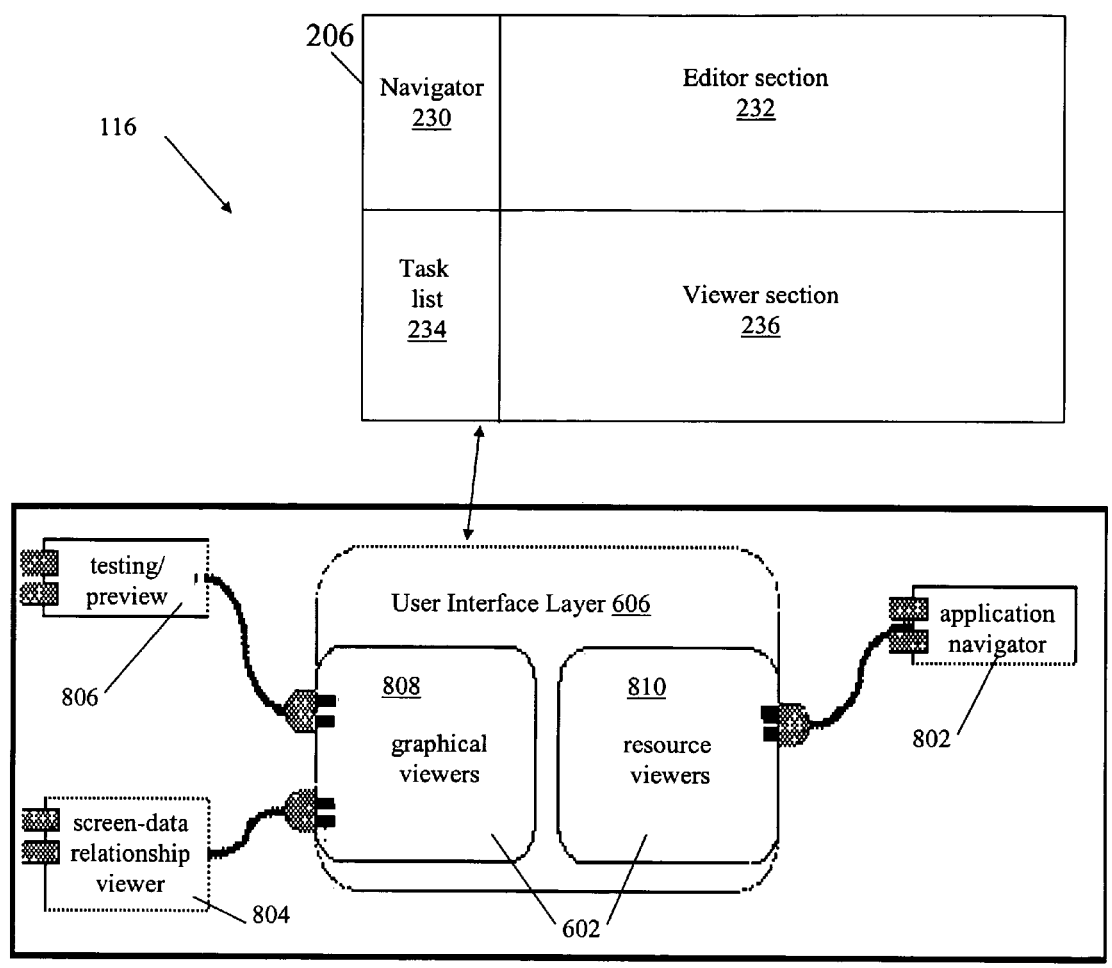
FIG. 8 shows viewers of the tool of FIG. 6.

Referring to FIGS. 6 and 8, the Runtime Data Model 610 represents the state of an emulated application 105 under development by the tool 116, using as a basis the contents of the design time data model 608. The runtime data model 610 stores values for the following major items, such as but not limited to: ☐Data Components 400 (see FIG. 4); ☐Global Variables; Message Components 404; ☐Resources 304,306 (see FIG. 3); ☐Screen Components 402 and ☐Styles. The Runtime Data Model 610 collaborates with the Design Time Data Model 608 and a Testing/Preview viewer 806 during emulation of application 105 for testing and preview purposes (for example). The viewer 806 also collaborates with the skin manager 616 for emulating the runtime data model 610 for a specified device 100 type. The Runtime Data Model 610 also notifies, through a bridge 613, the viewer 806 as well as any other modules 601 of the UI layer 606 associated with changes made to the model 610. For example, an API call can be used as a notifier for the associated modules 601 when the state of the model 610 has changed.

Referring to FIGS. 6 and 4, the Design Time Data Model 608 represents the state of an application 105 development project and interacts with the modules 601 of the UI layer 606 by notifying modules 601 when the state of the model 608 has changed as well as saving and loading objects from storage 210. The model's 608 primary responsibility is to define the applications 105 including such as but not limited to the following items: Data Component 400 Definitions; Global Variable Definitions; Message Component 404 Definitions; Resource 304,306 Definitions; Screen Component 402 Definitions; Scripts 406; Style Definitions and Backend data source 106 Mapping 302 Descriptors. The Design Time Data Model 608 responds to commands of each editor 600, viewer 602. The Design Time Data Model 608 also fires events to modules 601 in response to changes in the model 608, as well as collaborating/communicating with the other modules 601 (module 601—module 601 interaction) by notifying respective modules 601 when the data model 608 has changed. The data model 608 depends on an interface in order to serialize model 608 content retrieval and storage to and from the memory 210.

The following describes the mechanism used by the tool 116 editors 600 and viewers 602 to interact with the data model 608. The EMF.Edit framework is an optional framework provided by the Eclipse framework. The tool 116 can use the EMF.Edit framework and generated code (for example) as a bridge or coupling 613 between the Eclipse UI framework and the tool data model 608. Following the Model-View-Controller pattern, the editors 600 and viewers 602 do not know about the model 608 directly but rely on interfaces to provide the information needed to display and edit the data in the model 608.

In general, for example a tree viewer uses a TreeContentProvider and LabelProvider interface to query the structure of the tree and get text and icons for each node in the tree respectively. Table viewers and list viewers work in a similar way but use the structured ContentProvider and LabelProvider interfaces. Each class in the data model 608 is a change notifier, that is, anytime an attribute or reference is changed an event is fired. In EMF, for example, a notification observer is called an adapter because not only does it observe state changes but it can extend the behaviour of the class it is attached to (without subclassing) by supporting additional interfaces. An adapter is attached to a model object by an adapter factory. An adapter factory is asked to adapt an object with an extension of a particular type. The adapter factory is responsible for creating the adapter or returning an existing one, the model object does not know about adapting itself. The tool 116 uses EMF to generate a set of adapters for the data model 608 called item providers. Each item provider is an adapter that implements provider interfaces to extend the behaviour of the model object so it can be viewed and edited and at the same time is a notification observer that can pass on state changes to listening views. The tool 116 connects the editors 600 and viewers 602 to the data model 608 by configuring the editors 600 and viewers 602 with one or more EMF.Edit classes, for example. Each EMF.Edit class supports an Eclipse UI provider interface. The EMF.Edit class implements an interface call by delegating to an adapter factory. The adapter factory then returns a generated adapter (an item provider) that knows how to access the data model 608. When the state of the model 608 changes the same adapters are used to update the viewers 602 and editors 600.

The following commands are example commands that can affect other related modules 601 of the UI layer 606: ComponentAdded—a component (i.e. Screen, Data etc.) has been added to the application 105; ComponentRemoved—a component has been removed from the application 105; ComponentRenamed—a component has been renamed; Navigation ControlChanged—a button or menu item has been added, removed or had its properties changed on a screen (e.g. component 402) of the application 105; DataBindingChanged—a data-bound control (of a message 404, data 400 and/or presentation 402 component) has been added, removed or had its properties changed on a screen; ScreenParameterListChanged—a parameter has been added or removed from one of the screen components 402; FieldMappingChanged—a message level, field level or prototype mapping has changed; MessageContainmentChanged—a containment relationship has changed; MessageFieldChanged—a message field has been added, removed or had its properties changed for a message 404 and/or a screen 402 component; DataFieldChanged—a data field has been added, removed or had its properties changed from a message 404, data 400 and/or presentation 402 component; NavigationChanged—a script that may contain navigation code has changed of a workflow component 406; LocalizedStringChanged—a literal string has been added, removed or changed and ExitCodeChanged—Exit code has been added or removed from a script of the workflow component 406.

The model validation 620 of the service layer 614 provides facilities for the UI layer 606 such as validating the design time data model 608. The ModelValidator 620 is used to check that the Design Time Data Model 608 representation of application 105 messages is in line with or otherwise agrees with the backend data source 106 presentation of messaging operations. The Model Validator 620 can be responsible to validate the model 608 representation of the application 105 to be generated, for example such as but not limited to elements of: workflow sanity of the workflow component 406; consistency of parameters and field level mappings of the components 400, 402, 404, 406; screen control mappings and screen refresh messages of the screen components 402; message and/or data duplications inter and intra component 400, 402,404,406. Another function of the validation 620 can be to validate the model's 608 representation of backend data source 106 messaging relationships. In order to achieve its responsibilities, the validator collaborates with the Design Time Data Model 608, an application generator 622 and the backend connector 616. Requests to the Model Validator 620 to validate the model 608 (or a portion of the model 608—on demand) are made through the application generator 622, using the tool user interface 202 for example, via a Validate Model interface (not shown) connecting the generator 622 to the validator 620. The Model Validator 620 in turn utilizes as part of the validation task the Design Time Data Model 608, which contains both the application 105 and mapping file meta model information, as well as the backend connector 616, which supports the interface to the backend data sources 106.

Figure 9:
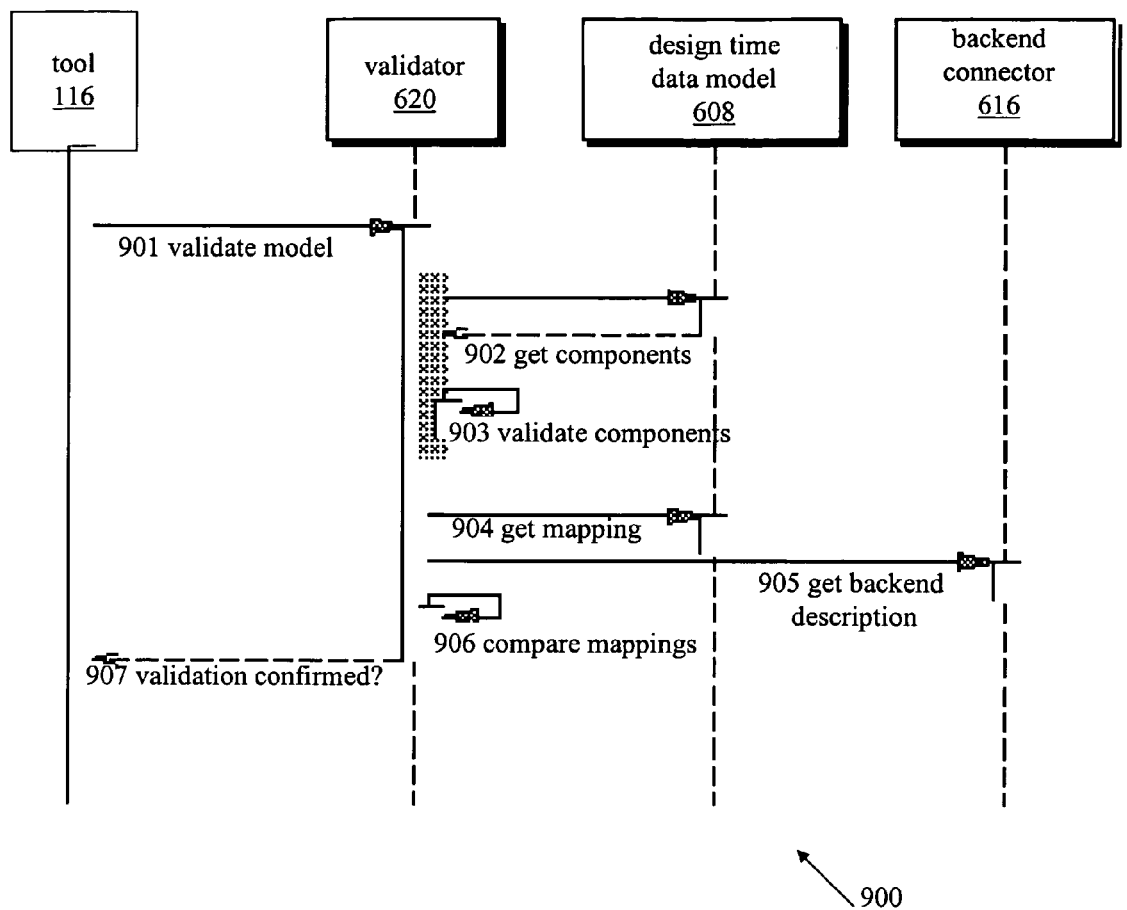
FIG. 9 shows a method of application validation using the tool of FIG. 6.

Referring to FIGS. 6 and 9, a model 608 validation sequence 900 is shown. First the validator 620 is requested 901 to validate the model 608. The validator obtains 902 all components 400,402,404,406 from the data model 608 and in turn validates 903 the contents of each component 400,402, 404,406. The validator 620 then gets 904 the backend mappings 302 from the data model 608 and then obtains 905 mapping information of the backend data sources 106. A comparison is then made 906 in order to validate 907 the model 608.

Referring again to FIG. 6, the localization Service 624 has responsibilities such as but not limited to: supporting a build time localization of user visible strings; supporting additional localization settings (e.g. default time & date display format, default number display format, display currency format, etc); and creating the resource bundle files 306 (and resources 304) that can be used during preparation of the deployable application 105 (e.g. an application jar file) by a BuildService 626. For example, the localization service 624 can be implemented as a resource module for collecting resources 304,306 that are resident in the design time data model 608 for inclusion in the deployable application 105. The JAR file can be a file that contains the class, image, and sound files for the application gathered into a single file and compressed for efficient downloading to the device 100. The Localization Service 624 is used by the application Generator 622 to produce the language specific resource bundles 306, for example. The BuildService 626 implements preparation of the resource bundles 306 and packaging the resource bundles 306 with the deployable application 105. The Localization Service 624 interacts (provides an interface) with the tool editors 600 and viewers 602 for setting or otherwise manipulating language strings and locale settings of the application 105.

Referring to FIG. 6, the application Generator 622 can be responsible for, such as but not limited to: generation of the application XML from the components 400,402,404; generation of mapping 302 descriptors; optimizing field ordering of the component 400,402,404 descriptors; and generation of dependencies and script transformation as desired, for storage in the memory 210. The application Generator 622 collaborates with the Design Time Data Model 608 to obtain the content of the developed components 400, 402,404,406 comprising the application 105. The application Generator 622 utilizes the Model Validator 620 to check that both the application 105 definitions (of the components 400,402,404,406) and mapping 302 description information are correct. The application Generator 620 then produces the application XML code, with inclusions and/or augmentations of the script of the workflow components 406, and mapping 302 file descriptor from relationships held in the Design Time Data Model 608. The application Generator 622 uses the Localization Service 624 to produce the language resource bundles 306, through for example a Resource Bundles interface (not shown). The application Generator 622 generation process is kicked off through a Generate application interface accessed by the developer using the UI 202 of the tool 116 (i.e. by user input events such as mouse clicks and/or key presses). It is recognised that the generator 622 can be configured as a collection of modules, such as but not limited to a code module for generating the XML 301 (which may include associated script) and a mappings module for generating the mapping 302 descriptors.

Figure 10:
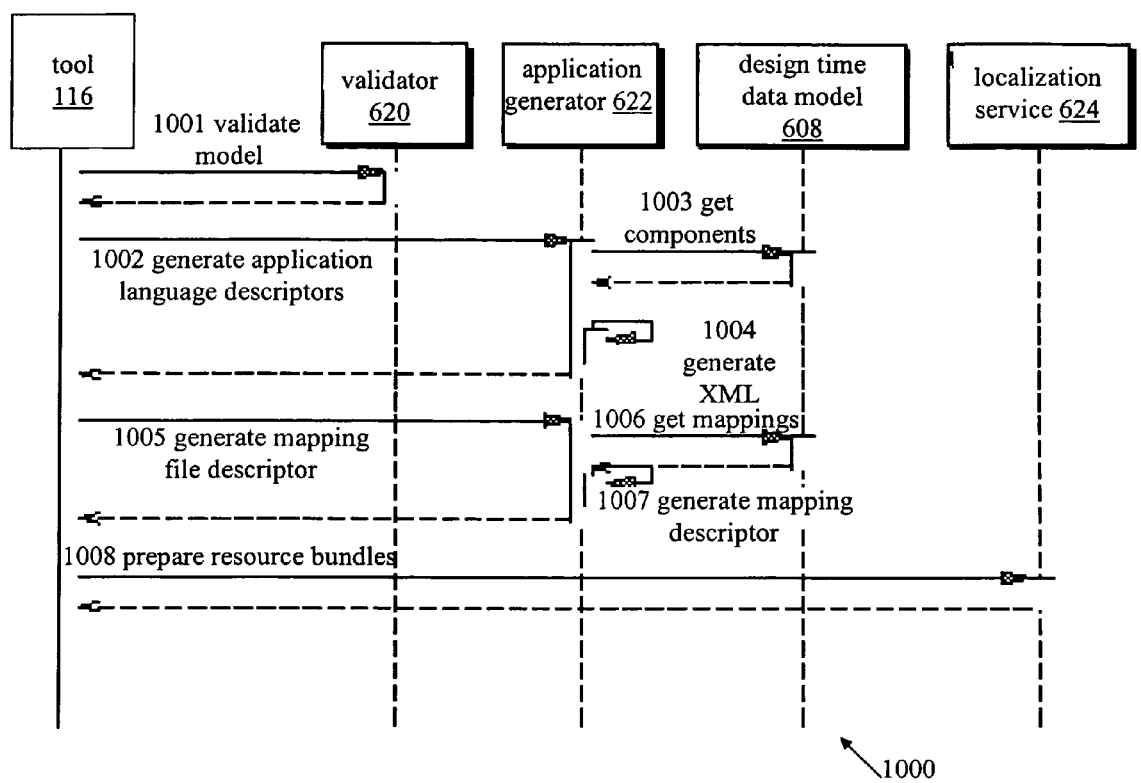
FIG. 10 shows a method of application generation using the tool of FIG. 6.

Referring to FIGS. 6 and 10, a sequence 1000 of generating the application artifacts 301 for the application 105, including the generation of mapping 302 files is shown. At step 1001 validate model 608 is performed by the validator 620. At step 1002 the application language descriptors (e.g. XML) 300

(which may include associated script) are generated by the generator 622 by getting 1003 the components 400,402,404, 406 from the model 608 and generating 1004 the corresponding XML 300. At step 1005 the backend mapping 302 file descriptors are generated by the generator 622 by obtaining 1006 the mappings from the data model 608 and then generating 1007 the backend mapping descriptors. At step 1008 the resource bundles 306 (and resources 304) are prepared by the localization service 624 to add to the application 105, as described above with reference to FIG. 3. The generated artifacts 310 of the application 105 are stored in the memory 210.

Referring again to FIGS. 2 and 6, the tool 116 can be a utility that runs on a single desktop computer 201. The tool 116 provides the main developer capability, which encapsulates the development, preview, validation and generation functions for application 105 development. However, it is recognised that a Build service 626 and/or a security service 632 can be packaged as a separate entity to permit the "homegrown" developer to create applications manually, separate from the other application development of the tool 116, and still utilize the preparation and security aspects of the deployable application 105 package (e.g. jar). It is also recognised that a Deployment service 628 can also be packaged separately to permit the "home-grown" developer to generate and deploy the appropriate application descriptor file. Accordingly, the tool 116 can make use of external build 626 and deployment 628 service utilities, internal build 626 and deployment 628 services (as shown in FIG. 6), or other configurations thereof as evident to a person skilled in the art.

Referring to FIGS. 3 and 6, the Build Service 626 provides an interface for building deployable form of the application 105 and is responsible for, such as but not limited to: generating a manifest file and generating the deployable application 105 jar file. The Build Service 626 uses available application XML 300 (which may include associated script), mapping descriptor files 302 and resource bundles 306 (and resources 304) as described above. The availability of these application 105 elements may be done either through the tool 116 application Generator 622, or manually in the case of the homegrown development approach using an external Build Service 626. The Security Service 632 is used to sign the manifest that contains unique information about the application 105. Finally, the Build Service 626 produces the deployable application 105 jar unit, including all artifacts and the signed manifest file. As noted above, the Build Service 626 can be packaged as a separate utility to the tool 116 and used by the tool 116 for packaging of the deployable application jar file.

Figure 11:
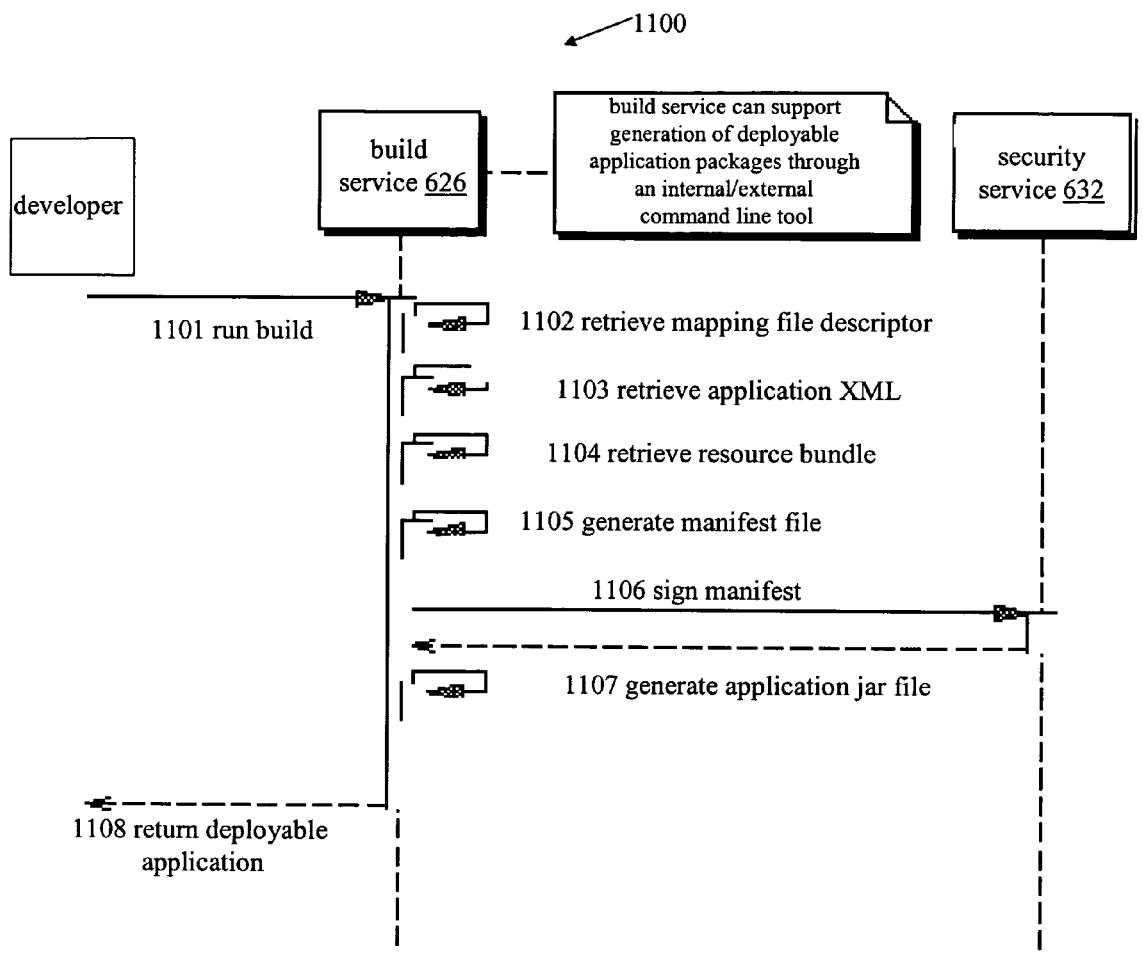
FIG. 11 shows a method of building a deployable application using application of FIG. 10.

Referring to FIGS. 6 and 11, the sequence 1100 of running the build service 626 to generate a deployable application 105 (e.g. as an application jar file) is shown. At step 1101 the developer initiates the build service 626 as either an internal (to the tool 116) or external as a separate utility once the application elements/artifacts 301 (see FIG. 3) have been generated by the application generator 622. At step 1102 the service 626 retrieves the available mapping 302 file descriptor and at step 1103 retrieves the available application XML 300 (which may include associated script). At step 1104 the service 626 retrieves the resources 304,306 and then generates 1105 the manifest file. At step 1106 the manifest is signed and then the application jar file is generated 1107. The deployable application 105 is then made available (e.g. stored in the memory 210) for eventual deployment by the deployment service 628.

Referring to FIG. 6, the Security Service 532 is employed to sign the manifest jar with a digest produced over the jar file contents and can have two main responsibilities, for example. First and foremost, the Security Service can be used to generate an IDE (integrated design environment) Tag that can be included in every application 105 jar file. Secondly, the Security Service 632 can provide a means to initialize a security infrastructure of the tool 116. The Build Service 626 interacts with the Security Service 632 at build time to produce the IDE Tag that can be part of every deployable application 105 jar manifest. The Security Service 632 can also interact with a build configuration element (not shown—potentially external to the service 632) for permitting configuration of the security service, such as but not limited to; initial setup of the signed certificate; for generation of new keys, generation of a key request, and installation of a signed certificate as is known in the art.

Referring again to FIG. 6, the Deployment Service 628 connects to the UDDI repository 114 to install/publish the generated application descriptor file, and can be responsible for generating the deployment descriptor of the application 105. The Deployment Service 628 uses the available application 105 jar file at deployment time. Although the Deployment Service 628 does not install the application 105 jar file, the service 628 introspects the jar file to determine what languages are supported (e.g. represented in the resource bundles 306). This information can be added to the descriptor file.

Figure 12:
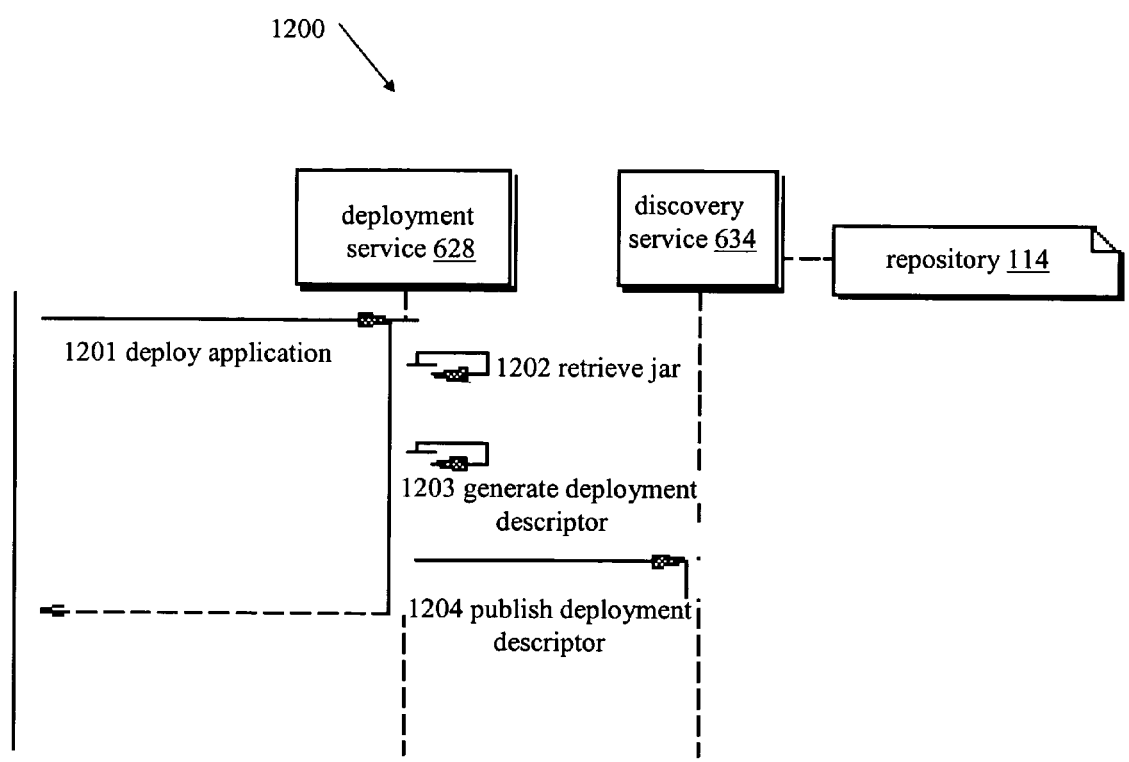
FIG. 12 shows a method of deploying the application of FIG. 11.

Referring to FIGS. 6 and 12, a sequence 1200 of deploying the application 105 to the UDDI (for example) repositories 114 is shown. At step 1201 the developer initiates the deployment service 628 as either an internal (to the tool 116) or external as a separate utility. At step 1202 the service 628 retrieves the available application jar. At step 1203 the service 628 generates the deployment descriptor of the application 105 and at step 1204 proceeds to publish the deployment descriptor through a discovery service 634 of the repository 114.

Figure 7:
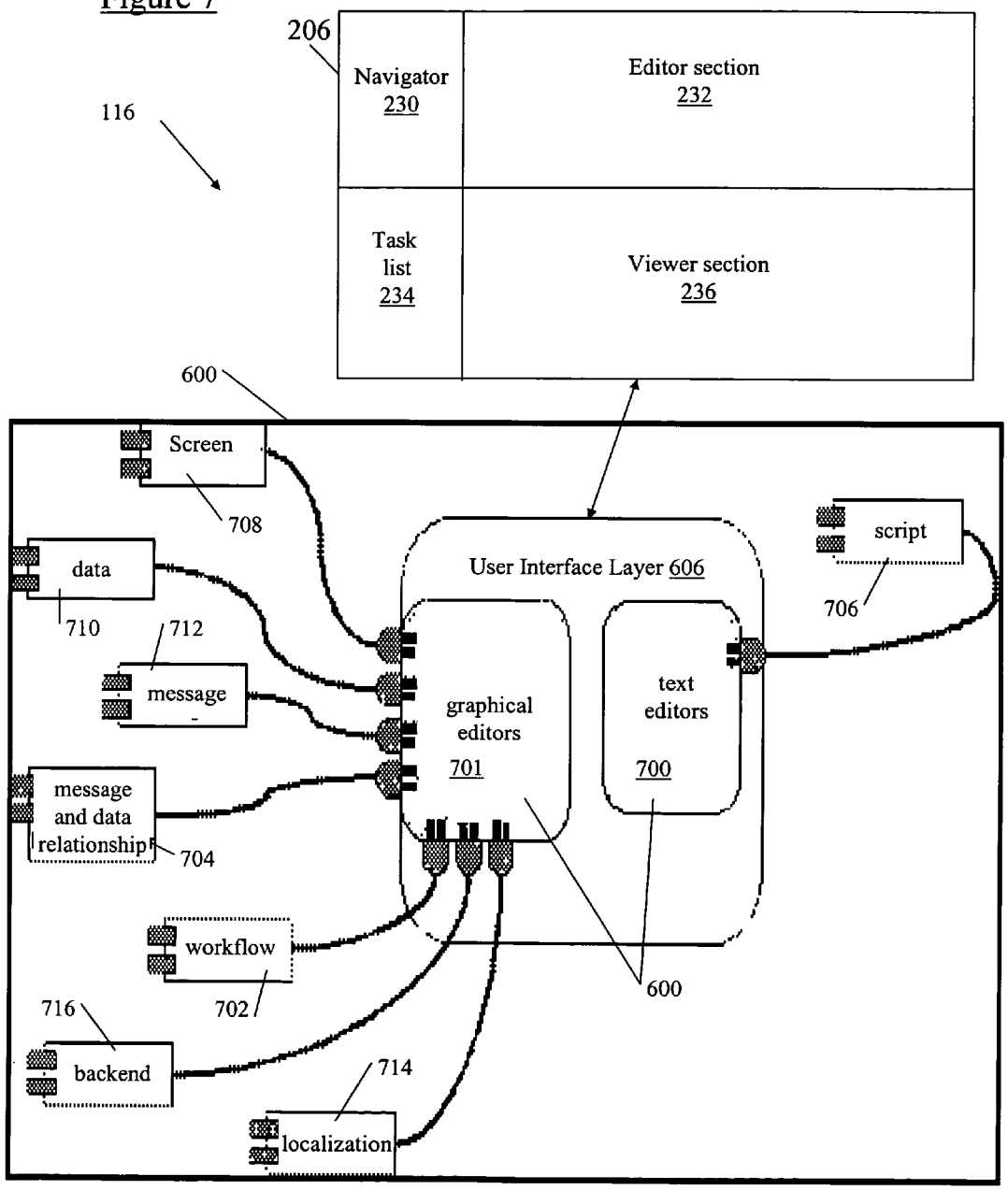
FIG. 7 shows editors of the tool of FIG. 6.

Referring to FIG. 7, the distribution of editors 600 in to Eclipse plug-ins (by way of example only) is shown. Tool editors 600 fall broadly into two categories, such as but not limited to the categories of: Text Editors 700 implement standard line based editing functionality and Graphical Editing Framework (GEF) Editors 701 that provide an edit space in which to draw objects. A GEF Editor 701 in the context of the tool 116 can contain a palette and a canvas, as is known in the art. The user can drop nodes (entities) from the palette onto the canvas and add connections (relationships) between them, so as to for example define the content and inter-relationships of the XML coding of the components 400, 402, 404, 406 (see FIG. 4). It is recognised that the editors 600 and viewers 602 are used to create and modify definitions contained in the components 400,402,404,406 s well as to create and modify the interdependencies of the definitions between the components (e.g. data-data, data-screen, message-data, screen-data, data-message) as further discussed below. It is recognised that the viewers 602 and editors 600 can be any combination of text based and/or graphical based modules 601, as desired. Editors 600

For Editor 600 and Data Model 608 decoupling, the editor 600 does not know about the data model 608 directly. The editor 600 relies on a UI provider interface (of Eclipse) to get the information needed to render the object under edit. The editor 600 can be configured with an EMF core object, for example when using the Eclipse platform) that implements a UI provider interface. e.g. ContentProvider, LabelProvider. The EMF provider object adapts UI calls by delegating to a generated adapter (ItemProvider) that knows how to access the data model 608.

In general, the editor 600 creates a command to change the model 608 so that the change can be undone through an undo API (not shown). The editor 600 can be configured with an EMF core object called an editing domain that maintains a command stack. The editing domain uses the adapter factory to find an adapter that can create the command. The generated adapter class (an ItemProvider) creates the command. The editor 600 executes the command by using the command stack. Further, using the Eclipse framework as an example, EMF models 608 are change notifiers. Because the ItemProvider is a notification observer it is notified when the data model 608 changes. The ItemProvider in turn notifies the Provider. The Provider tells the Editor 600 and PropertySheet to refresh after a change notification.

Script Editor 706

The script editor is a constrained text editor for writing the commands (e.g. JavaScript™) of the application 105 components, such as but not limited to the workflow component 406—see FIG. 4. Some syntax such as creating functions can be restricted where it is not user-definable in the component application 105. Example commands editable by the script editor 706 can include commands such as but not limited to SaveScript which is used when the user saves a script of the application 105. SaveScript can trigger the data model 608 commands of NavigationChanged, LocalizedStringChanged and ExitCodeChanged, if successful. Example input events of the script editor 706 can include events such as but not limited to: ComponentRemoved whereby if the component (400, 402, 404, 406) removed affects input parameters to the script or globals used by the script, the script editor 706 prompts the user of the tool 116 that the modified script is invalid; and ComponentRenamed which has the same interest as ComponentRemoved. An example interface of the script editor 706 extends the org.eclipse.ui.editors extension point of the Eclipse framework by implementing a subclass of the org.eclipse.ui.editors.texteditors hierarchy. The tool 116 coordinated the creation and/or modification of scripts in the (e.g. workflow 406) components as well as the inter-relation of the created/modified script affecting other associated components of the application 105.

Screen Editor 708

The screen editor 708 is responsible for facilitating the user of the tool 116 to define and laying out the structured definition language code (e.g. XML) in the screen components 402 of the application 105 associated with display of data on the device 100. UI controls for inclusion in the screen components 402 an can be dropped onto a form canvas (not shown) in the editor section 232 of the display (see FIG. 206). Control properties including event handlers can also be edited by the screen editor 708.

Example commands editable by the screen editor 708 can include commands such as but not limited to: ButtonChange which is sent (to the data model 608) when the developer changes a button control, this command triggers NavigationControlChange of the data model 608 if successful; MenuItemChange which is sent when the developer changes a menu item, this command triggers NavigationControlChanged of the data model 608 if successful; ChangeScript which is sent when the developer changes a script, this command triggers NavigationControlChanged of the data model 608 if successful; QueryMessages which is sent when the developer needs a list of available messages that screen of the application 105 may send or refresh on, and returns a list of available messages; QueryData which is sent when the developer needs a list of available data objects to bind controls to, and returns a list of available data; NonNavigationControlChange which is sent when a control that does not affect navigation (e.g. label, text field) has been modified; and DataBindingChange which is sent when a databinding has changed, this command triggers DataBindingChanged and ScreenParameterListChanged of the data model 608 if successful. Example input events of the screen editor 708 can include events such as but not limited to: ComponentRemoved whereby the screen developer (user of the tool 116) checks to see if the component is a message the associated screen component 402 is using for navigation, a Data object that the screen component 402 has controls bound to or a script (e.g. workflow component 406) that handles a screen event of the screen component 402; ComponentRenamed has the same interest as ComponentRemoved; ScreenParameterListChanged modifies the screen component 402 such as if a parameter that was in use has been changed, the screen component 402 must either adjust that parameter or warn the developer that those dependencies are no longer valid and must be changed; MessageFieldChanged whereby the Screen developer checks to see if the field in question is in use by the screen component 402; and DataFieldChanged whereby the Screen developer checks to see if any controls were bound to the field(s) that have changed and warns the developer appropriately.

An example interface of the screen editor 708 extends org.eclipse.ui.editors of the Eclipse framework using the GEF GraphicalEditor and/or a VE editor. The tool 116 coordinates the creation and/or modification of screen definitions in the (e.g. screen 402) components as well as the inter-relation of the created/modified screen definitions (and associated data definitions) affecting other associated components of the application 105.

Data Editor 710

The data editor 710 is responsible for facilitating the user of the tool 116 to create and modify the structured definition language code (e.g. XML) in the data components 400 (and possibly screen 402 and message 404 components) of the application 105 by providing the developer the ability to edit a Data Component 400 fields and properties. New Data objects can be created from scratch, by prototyping existing Data objects or based on data definition mappings to Message objects in message components 404.

Example commands editable by the data editor 710 can include commands such as but not limited to: AddRemoveFields which is sent when the developer adds or removes a field from a Data object definition, this command triggers DataFieldChanged of the data model 608 if successful; LinkToExternalData which is sent when the developer links a data object definition to an external (to the application 105) Data object, such as but not limited to a Calendar or Contacts data object, this command triggers DataFieldChanged of the data model 608 if successful.

Example input events of the data editor 710 can include events such as but not limited to: ComponentRemoved whereby the screen developer (user of the tool 116) checks to see if the object that was removed was related to the message through prototyping or containment, then the developer can adjust the fields contained in the Data object affected; and ComponentRenamed has the same interest as in ComponentRemoved.

An example interface of the screen editor 708 extends org.eclipse.ui.editors using the GEF GraphicalEditor. The tool 116 coordinates the creation and/or modification of data definitions in the (e.g. data 400) components as well as the inter-relation of the created/modified data definitions (and associated screen/message definitions) affecting other associated components of the application 105.

Message Editor 712

The message editor 712 is responsible for facilitating the user of the tool 116 to create and modify the structured definition language code (e.g. XML) in the message components 404 of the application 105. The message designer provides for the developer to create and edit component messages that are sent to and arrive from the backend data sources 106 (in relation to the device 100). These messages can include both request/response pairs as well as subscribe/notify/unsubscribe notification messages. Message definitions can be created by prototyping existing messages or by templating based on back-end services of the data sources 106 such as WSDL and JDBC/SQL.

Example commands editable by the message editor 712 can include commands such as but not limited to: AddRemoveFields which is sent when the developer adds or removes field from a
message in a message component 404. Example input events of the message editor 712 can include events such as but not limited to: ComponentRemoved whereby the screen developer (user of the tool 116) checks to see if a message that this message definition prototypes or contains has been removed, then the view must be updated; ComponentRenamed has the same interest as ComponentRemoved; and FieldMappingChanged whereby the screen developer (user of the tool 116) checks to see if the field mapping effects the message definitions being edited, then the Message developer checks to see if any message fields have been added/removed/renamed by the change in the mapping.

An example interface of the screen editor 708 extends org.eclipse.ui.editors using the GEF GraphicalEditor. The tool 116 coordinates the creation and/or modification of message definitions in the (e.g. message 404) components as well as the inter-relation of the created/modified message affecting other associated components of the application 105.

Workflow Editor 702

The workflow editor 702 is responsible for facilitating the user of the tool 116 to create and modify the command code (e.g. ECMA Script) in the workflow components 406 of the application 105. The workflow editor 702 defines the screen-to-screen transitions that form the core of the visual part of the component application 105. Screens and transitions between screens due to user/script events are rendered visually.

Example commands editable by the workflow editor 702 can include commands such as but not limited to: QueryScreens which is sent when the developer wants a list of screens to select from, such as when adding a new screen to the workflow; QueryScripts which is sent when the developer wants a list of scripts to call on a screen navigation event; QueryArrivingMessages which is sent when the developer wants a list of response messages (including notifications) on which to key screen transitions; AddComponent which is sent when the developer wants to add a new screen, message or script to the workflow that doesn't already exist in the workflow, this command triggers ComponentAdded of the data model 608 if successful; and ChangeNavigation which is sent when the developer adds a new navigation to the workflow, this command triggers NavigationChanged of the data model 608 if successful.

Example input events of the workflow editor 702 can include events such as but not limited to: ComponentRemoved whereby the workflow developer (user of the tool 116) checks to see if the component is a workflow object (Screen, Script, Arriving Message), then the Workflow updates itself by deleting all relationships with this object definition; ComponentRenamed whereby the workflow developer (user of the tool 116) checks to see if the component is a workflow object, then the workflow updates its visual with the new name of the component; NavigationControlChanged whereby the workflow developer (user of the tool 116) checks to see if the workflow must update its view of the navigation based on the control change, if for example a button has been added to a screen in the workflow, then the view is updated to show the availability of a new navigation node on that screen; ScreenParameterListChanged whereby the workflow developer (user of the tool 116) checks to see if a screen's parameter list has changed and that screen is in the workflow, then the developer updates the view of any navigation involving that screen; Navigation Changed whereby the workflow developer (user of the tool 116) checks to see if a possible navigation change has occurred, the developer finds and parses the change and makes any necessary updates to the view; and ExitCodeChanged whereby the workflow developer (user of the tool 116) checks to see if an exit point has been added/removed, then editor view is updated to reflect this visually. An example interface of the screen editor 708 extends org.eclipse.ui.editors using the GEF GraphicalEditor.

Message-Data Relationship Editor 704

The message editor 704 is responsible for facilitating the user of the tool 116 to create and modify the structured definition language code (e.g. XML) in the inter-related message 404 and data 400 components of the application 105. The message/data relationship editor creates and edits relationships between Message Components 404 and Data Components 400. These mappings effect how a Data Component 400 is populated on Message arrival to the device 100 when running the application 105. For example, data object definitions common between data 400 and message 404 components can be such that the data object definitions can be resident in the data component 400, while a only data mapping definition (stating where the data object definition(s) can be found) linking the message component 404 to the data object definition in the data component 400 can be resident in the message component 404, or vice versa. A similar configuration can be employed for data object definitions common between screen 402 and data 400 components, whereby the data object definition is resident in one of the components and the data mapping definition is resident in the other associated component, as further described below in relation to the screen-data relationship viewer 804 (see FIG. 8).

Example commands editable by the editor 704 can include commands such as but not limited to: AddComponent which is sent when the user adds a new Data or Message to the relationship diagram with the effect of also adding that component to the application 105 being developed, this command triggers ComponentAdded of the data model 608 if successful; QueryMessages which is sent when the developer needs a list of Messages to map; QueryData which is sent when the developer needs a list of Data to map; ChangeMessageLevelMapping which is sent when the developer changes a message level mapping, this command triggers FieldMappingChanged of the data model 608 if successful; ChangeFieldLevelMapping which is sent when the developer changes a field level mapping, this command triggers FieldMappingChanged of the data model 608 if successful; ChangePrototype which is sent when the developer changes (adds/removes) a prototype relationship between Data objects, this command triggers FieldMappingChanged of the data model 608 if successful; and ChangeContainment which is sent when the developer changes a containment relationship between Data objects, this command triggers MessageContainmentChanged of the data model 608 if successful.

Example input events of the editor 704 can include events such as but not limited to: ComponentRemoved whereby the developer (user of the tool 116) checks to see if the object removed was a Message or Data, the relationship mapper deletes any relationships involving the removed object; ComponentRenamed whereby the developer (user of the tool 116) checks to see if the renamed object is involved in any mapping relationships, the visual representation of the mapped object is updated with the new name; MessageFieldChanged whereby the developer (user of the tool 116) checks to see if the message concerned is present in the relationship editor, then field change is reflected in the visual representation of the message, if the field in question is involved in a mapping, then changes are reflected and the developer may need to be warned of broken mappings (if for example, a field has been removed); and DataFieldChanged has the same interest as MessageFieldChanged except with Data instead of Messages.

An example interface of the editor 704 extends org.eclipse.ui.editors using the GEF GraphicalEditor. The tool 116 coordinates the creation and/or modification of message/data definitions in the (e.g. message/data 404/400) components as well as the inter-relation of the created/modified message/data definitions affecting other associated components of the application 105.

Localization Editor 714

The localization editor 714 provides for the developer to collect all strings that will be visible to the application 105 end-user (of the device 100) and edit them in one place. The editor 714 also provides for the developer to create multiple resource mappings for each string into different languages. Example commands editable by the editor 714 can include a command such as but not limited to: ChangeLocalizeString which is sent when the developer adds, deletes or modifies a localized string. An example input event of the editor 714 can include an event such as but not limited to: LocalizedStringChanged which is used to determine when a string literal has been changed in the script editor or a label has changed in the screen editor 708. The Localization Editor 714 can extend the org.eclipse.ui.editors interface by extending an EditorPart.

Backend Visualizer Editor 716

The backend visualizer 716 shows the developer the relationships between Message Components 404 and the backend data sources 106 (web services, SQL etc.—see FIG. 1) that drive the components 404. The editor 716 also provides for the developer to add new sources 106 to the list of those supported by the application 105 in development. In addition to interaction with the design time data model 608, as is described for other modules 601 using commands and events received, the Backend Visualizer editor 716 collaborates with the Backend Connector 616 (see FIG. 6). The Backend Connector 616 provides for the visualizer to request a Services-Interface from a registry of known service types (e.g. Web Services, SQL Databases). A list of Services of this type is returned that can queried by name or by iteration.

Example commands editable by the editor 716 can include commands such as but not limited to: AddComponent which is sent when the developer adds a new message, this command triggers ComponentAdded of the data model 608 if successful; and SpecifyMapping which is sent when the developer connects a message to a selected backend data source 106. Example input events of the editor 716 can include events such as but not limited to: ComponentRemoved whereby the developer (user of the tool 116) checks to see if the component is a message, the backend visualizer adjusts its mappings for that message; ComponentRenamed has the same interest as ComponentRemoved; and MessageFieldChanged whereby the developer (user of the tool 116) validates the message field against what exists on the backend and visually notifies of any broken mappings. Backend data sources 106 are accessed through direct calls to the service layers. Optionally, background processing may be used to keep network processing from blocking UI threads. The Editor 716 can extend the org.eclipse.ui.editors using the GEF GraphicalEditor.

Viewers 602

Referring to FIGS. 6 and 8, viewers 602 are modules 601 that commit their changes to the data model 608 as soon as the developer makes them. Referring to FIG. 8, the distribution of viewers 602 in to Eclipse plug-ins (by way of example only) is shown. Tool viewers 602 fall broadly into two categories, such as but not limited to the categories of: Resource viewers 810 and Graphical Editing Framework (GEF) viewers 808, which provide an edit space in which to view objects. The user can view nodes (entities) and connections (relationships) between them, so as to for example define the content and inter-relationships of the XML coding of the components 400, 402, 404, 406 (see FIG. 4). It is recognised that the viewers 602 are used to create and modify definitions contained in the components 400,402,404,406 s well as to create and modify the interdependencies of the definitions between the components (e.g. data-data, data-screen, message-data, screen-data, data-message) as further discussed below. The Eclipse viewers are modules 601 that commit changes to the data model 608 as soon as the user makes one. The Viewers 602 include: the Application Navigator 802 which shows a hierarchical view of the application 105 projects in the workspace of the display 206 (see FIG. 2) realized by a tree view (for example); a Testing/Preview viewer 806 that emulates the runtime behaviour of the application 105 and the Screen-Data Relationship viewer 804 that can be a read-only view of the relationships between a screen 402 and the data 400 components that are bound to the respective screens. Each viewer 602 can create an extension point at org.eclipse.ui.views and can implement the IViewPart interface of the Eclipse platform, usually through a selected default super-class.

Application Navigator Viewer 802

The Application Navigator 802 provides the developer with a hierarchical tree view (for example) of all the project applications 105, folders and files in the workspace of the display 206. The developer can browse and manipulate the objects definitions associated with the selected application 105 project from the Application Navigator 802.

Example commands by the viewer 802 can include commands such as but not limited to: AddComponent which is sent when a new component is added to the application 105 project through a New menu on a navigator context menu (not shown), this command triggers ComponentAdded of the data model 608 if successful; RemoveComponent which is sent when a component is removed by deleting it from the navigator context menu, this command triggers ComponentRemoved of the data model 608 if successful and RenameComponent which is sent when a component is renamed by selecting it in the navigator, this command triggers ComponentRenamed of the data model 608 if successful.

Example input events of the viewer 802 can include events such as but not limited to: ComponentAdded for when a component is added, the navigator 802 refreshes its view of the project application 105 and ComponentRemoved has the same interest as ComponentAdded. Example interfaces for the navigator viewer 802 is such that the viewer 802 extends the org.eclipse.ui.views extension by sub-classing org.eclipse.ui.views.navigator.ResourceNavigator, by example for the Eclipse framework.

Screen Data Relationship Viewer 804

The Screen/Data viewer 804 provides for the developer to view the relationships between a given screen definition and the Data definition that is bound to it. The interface can be read-only and is constructed from design time data contributed by the associated Screen 404 and Data 400 components. For a read only viewer 804, the viewer 804 does not have any commands that affect the data model 608. Example input events of the viewer 804 can include events such as but not limited to: ComponentRemoved whereby the developer (user of the tool 116) checks to see if the component removed is a Screen 402 or Data 400 component, the developer removes any relationships with the removed component; DataBindingChanged whereby the developer (user of the tool 116) checks to see if the component is a Screen 402 or a Data 400 component and is currently open in the viewer 804, then the name of the component is updated and ComponentRenamed whereby the developer (user of the tool 116) checks to see if the DataBinding involves a Screen 402 and/or Data 400 components that are currently open, then any new relationships are depicted in the view of the display 206 (see FIG. 2). The viewer 804 can extend org.eclipse.ui.editors using the GEF GraphicalEditor, but as a "read-only" editor view.

Testing/Preview Viewer 806

The Testing/Preview viewer 806 emulates the runtime behavior of the application 105 outside of the device 100 (on the designer's computer 201—see FIG. 2). The viewer 806 interacts with: the ☐Skin Manager 618 of the service layer 614 (see FIG. 6) such that a collection of skin plug-ins are managed for the emulated device 100; the Runtime Data Model 610 that models the properties and state of the emulated application 105 and the ☐Design Time Data Model 608 that provides the metadata for the emulated application 105, such as what visual elements exist on a screen and how they are to be laid out.

Referring to FIGS. 1 and 9, a method 900 is shown for developing the application 105 having component 2 400,402, 404 with descriptors expressed in a structured definition language and component 406 expressed as a series of instructions. It is recognised that individual components 400,402, 404, 406 interact for processing messages on the runtime environment RE of the device 100 that are received from the datasource 106 over the network 10. In constructing the application 105, the definitions of the components 400,402,404 are developed 902 through interaction with the data model 608, the model 608 for providing a persistent state of the application. The instructions of the second component are developed 904 through interaction with the data model 608. Message mapping information of the data source 106 selected for the application 105 is obtained 906 for assisting in the generation of the definitions based on the mapping information. Once completed, the components 400,402,404,406 are assembled 908 into the application 105.

Example Elements 301

The following are example elements 301 for the deployable application 105 jar file that has been generated by the tool 116 for a Weather Web Service as an example of the datasource 106.

Weather.mapping

The as a text file entitled "11078331_2.txt" submitted in a computer program listing appendix on a compact disc defines example mappings 302 to be used by application gateway AG to the application messaging over the network 10 with Web Service SOAP messages defined in WSDL. The information and/or data contained 11078331_2.txt is incorporated by reference in its entirety.

Weather.xml

The submitted as a text file entitled "11078331_3.txt" in a computer program listing appendix on a compact disc defines example XML definitions 300 (e.g. representing components 400,402,404) for inclusion in the deployable application 105 jar file (to be provisioned to the device 100). The information and/or data contained 11078331_3.txt is incorporated by reference in its entirety.

Weather.script

The following defines example application 105 workflow scripts (e.g. workflow component 406) which can augments the XML definitions 300 given above when provisioned to the device 100.

```
function script_inGetWeatherByZipSoapOut_onClose( ){scr_Main.display( );}
function script_Err_back( ){Screen.back( );}
function
inGetWeatherByZipSoapOut_onMsgArrive( ){scr_inGetWeatherByzipSoapOut.display( );
}
function
script_outGetWeatherByZipSoapIn_onSubmit( ){outGetWeatherByZipSoapIn.parameters=
Global.gv_GetWeatherByZip;
outGetWeatherByZipSoapIn.send( );
scr_Main.display( );}
function script_inGetWeatherByCityStateSoapOut_onClose( ){scr_Main.display( );}
function
inGetWeatherByCityStateSoapOut_onMsgArrive( ){scr_inGetWeatherByCityStateSoapOut.
display( );}
function
script_outGetWeatherByCityStateSoapIn_onSubmit( ){outGetWeatherByCityStateSoapIn.
parameters=Global.gv_GetWeatherByCityState;
outGetWeatherByCityStateSoapIn.send( );
scr_Main.display( );}
function script_inGetWeatherByIPSoapOut_onClose( ){scr_Main.display( );}
function
inGetWeatherByIPSoapOut_onMsgArrive( ){scr_inGetWeatherByIPSoapOut.display( );}
function
script_outGetWeatherByIPSoapIn_onSubmit( ){outGetWeatherByIPSoapIn.parameters=Global.
gv_GetWeatherByIP;
outGetWeatherByIPSoapIn.send( );
scr_Main.display( );}
function
script_inGetWeatherHistoricalByZipSoapOut_onClose( ){scr_Main.display( );}
function
```

```
inGetWeatherHistoricalByZipSoapOut_onMsgArrive( ){scr_inGetWeatherHistoricalByZip
SoapOut.display( );}
function
script_outGetWeatherHistoricalByZipSoapIn_onSubmit( ){outGetWeatherHistoricalBy
ZipSoapIn.parameters=Global.gv_GetWeatherHistoricalByZip;
outGetWeatherHistoricalByZipSoapIn.send( );
scr_Main.display( );}
function script_inGetWeatherByWMOIDSoapOut_onClose( ){scr_Main.display( );}
function
inGetWeatherByWMOIDSoapOut_onMsgArrive( ){scr_inGetWeatherByWMOIDSoapOut.display( );}
function
script_outGetWeatherByWMOIDSoapIn_onSubmit( ){outGetWeatherByWMOIDSoapIn.parameters=
Global.gv_GetWeatherByWMOID;
outGetWeatherByWMOIDSoapIn.send( );
scr_Main.display( );}
function script_inGetWMOIDByCitySoapOut_onClose( ){scr_Main.display( );}
function script_WMOID_back( ){Screen.back( );}
function
inGetWMOIDByCitySoapOut_onMsgArrive( ){scr_inGetWMOIDByCitySoapOut.display( );}
function
script_outGetWMOIDByCitySoapIn_onSubmit( ){outGetWMOIDByCitySoapIn.parameters=Global.gv_GetWMOIDByCity;
gv_GetWMOIDByCity;
outGetWMOIDByCitySoapIn.send( );
scr_Main.display( );}
```

1_0.dtd (DTD (Document Type Definition)

The submitted as a text file entitled "11078331_4.txt" in a computer program listing appendix on a compact disc defines an example document structure for the applications 105. The information and/or data contained 11078331_4.txt is incorporated by reference in its entirety.

```
<!ENTITY % commonFieldAttrs 'name CDATA #REQUIRED
      type (string | integer | decimal | boolean | date | data | enumeration)
"string"
      component IDREF #IMPLIED
      array (true | false) "false"
      '>
<!ENTITY % commonCtrlAttrs 'name CDATA #REQUIRED
      inValue CDATA #IMPLIED
      placement CDATA #IMPLIED
      style IDREF #IMPLIED
      '>
<!ENTITY % nestedCtrlElements '(region | label | separator |
edit | textarea | image | singleChoice | multiChoice | button)*'>
<!--root element: application -->
<!ELEMENT application (desc?, dependency*, resource*, global*,
enumeration*, data*, message*, style*, screen*, script*)>
<!--URI will contain version information-->
<!--entry: main screen or first script to be executed-->
<!--dependency: could be multiple-->
<!--icon: icon resource-->
<!ATTLIST application
      name CDATA #REQUIRED
      uri CDATA #REQUIRED
      entry IDREF #IMPLIED
      vendor CDATA #IMPLIED
      version CDATA #IMPLIED
      size CDATA #IMPLIED
      icon CDATA #IMPLIED
      persistence (reliable | performant) "performant"
      messageDelivery (standard | bestEffort | reliable ) "standard"
>
<!ELEMENT desc (#PCDATA)>
<!ELEMENT dependency EMPTY>
<!ATTLIST dependency
      type (application | application | runtime | feature) "application"
      value CDATA #IMPLIED
      version CDATA #IMPLIED
>
<!ELEMENT resource EMPTY>
<!--mimeType: text/xml, image/gif, image/jpeg, media/pme, ?-->
<!ATTLIST resource
      name ID #REQUIRED
      url CDATA #REQUIRED
      mimeType CDATA #REQUIRED
      deferred (true | false) "false"
>
<!ELEMENT global (value*)>
<!ATTLIST global
      %commonFieldAttrs;
>
<!ELEMENT enumeration (value+)>
<!ATTLIST enumeration
      name ID #REQUIRED
>
<!ELEMENT value (#PCDATA)>
<!ELEMENT data (field*)>
<!--if key is not defined then the data is single instanced-->
<!--Phase 2.0: data will include readOnly (true | false) "false"-->
<!ATTLIST data
      name ID #REQUIRED
      prototype CDATA #IMPLIED
      persist (true | false) #IMPLIED
      key CDATA #IMPLIED
>
<!ELEMENT field EMPTY>
<!--default: default value for the field (e.g. ?true?, ?@current?, ?12/07/03
@F:DD/MM/YY??)-->
<!ATTLIST field
      %commonFieldAttrs;
      default CDATA #IMPLIED
>
<!--script is used only for incoming messages:-->
<!--maps message to data-->
<!--script to process the msg-->
<!ELEMENT message ((field | mappedField)*, alert?)>
<!--prototype:parent message-->
<!--mapping:mapped data cmp-->
<!ATTLIST message
      name ID #REQUIRED
      prototype IDREF #IMPLIED
      script IDREF #IMPLIED
      secure (true | false) #IMPLIED
>
<!--attrib mapping maps mfield to data.field-->
<!ELEMENT mappedField EMPTY>
<!ATTLIST mappedField
      name CDATA #REQUIRED
      mapping CDATA #IMPLIED
>
<!ELEMENT alert EMPTY>
<!-- perhaps an inbox alert later -->
<!ATTLIST alert
```

```
    beep (true | false) "false"
    ribbon (true | false) "false"
    dialogText CDATA #IMPLIED
>
<!ELEMENT style EMPTY>
<!ATTLIST style
    name ID #REQUIRED
    font CDATA #IMPLIED
    size CDATA #IMPLIED
    bold (true | false) "false"
    italic (true | false) "false"
    underline (true | false) "false"
    fgColor CDATA #IMPLIED
    bgColor CDATA #IMPLIED
    bgImage IDREF #IMPLIED
>
<!ELEMENT screen (param*, var*, (%nestedCtrlElements; | repetition),
menu?, onInit?)>
<!--no menu for dialog-->
<!--attr refreshMsg points to message-->
<!ATTLIST screen
    name ID #REQUIRED
    title CDATA #IMPLIED
    dialog (true | false) "false"
    layout (grid | flow | vertical ) #REQUIRED
    style IDREF #IMPLIED
    refreshMsg IDREFS #IMPLIED
>
<!-- local variable for a screen; can be mapped to -->
<!ELEMENT var EMPTY>
<!ATTLIST var
    name CDATA #REQUIRED
    component IDREF #REQUIRED
>
<!ELEMENT region (condition?, %nestedCtrlElements;)>
<!ATTLIST region
    layout (grid | flow | vertical) #REQUIRED
    placement CDATA #IMPLIED
    style IDREF #IMPLIED
>
<!-- item/control visibility condition-->
<!ELEMENT condition EMPTY>
<!ATTLIST condition
    params CDATA #IMPLIED
    script IDREF #REQUIRED
    onTrue (show | hide) "show"
>
<!ELEMENT onInit EMPTY>
<!ATTLIST onInit
    params CDATA #IMPLIED
    script IDREF #IMPLIED
>
<!ELEMENT onChange EMPTY>
<!ATTLIST onChange
    params CDATA #IMPLIED
    script IDREF #IMPLIED
>
<!ELEMENT onFocusOut EMPTY>
<!ATTLIST onFocusOut
    params CDATA #IMPLIED
    script IDREF #IMPLIED
>
<!-- transaction can be used to accept/rollback changes on the screen-->
<!ELEMENT onClick EMPTY>
<!ATTLIST onClick
    params CDATA #IMPLIED
    transition IDREF #IMPLIED
    transaction (commit | rollback | none) "none"
>
<!-- repetition control is a hybrid of a region and a choice -->
<!-- its layout is inherited from the screen -->
<!ELEMENT repetition %nestedCtrlElements;>
<!ATTLIST repetition
    %commonCtrlAttrs;
    mapping CDATA #IMPLIED
    collapsible (true | false) "false"
>
<!ELEMENT menu (item*)>
<!ELEMENT item (condition?, onClick?)>
<!ATTLIST item
    name CDATA #REQUIRED
    inValue CDATA #IMPLIED
>
<!ELEMENT separator (condition?)>
<!ATTLIST separator
    %commonCtrlAttrs;
    isWhitespace (true | false) "false"
>
<!ELEMENT label (condition?, onInit?)>
<!ATTLIST label
    %commonCtrlAttrs;
>
<!ELEMENT edit (condition?, onInit?, onFocusOut?)>
<!ATTLIST edit
    %commonCtrlAttrs;
    mapping CDATA #IMPLIED
    readOnly (true | false) "false"
    mandatory (true | false) "false"
    type (number | currency | date | time | percentage | text | URL |
password | phone | email) "text"
    format CDATA #IMPLIED
>
<!--The textarea is multiline with dynamic scrollbar-->
<!ELEMENT textarea (condition?, onInit?, onFocusOut?)>
<!ATTLIST textarea
    %commonCtrlAttrs;
    mapping CDATA #IMPLIED
    readOnly (true | false) "false"
    mandatory (true | false) "false"
    visibleRows CDATA #IMPLIED
>
<!ELEMENT image (condition?, onInit?)>
<!ATTLIST image
    %commonCtrlAttrs;
    resource IDREF #IMPLIED
>
<!--readOnly implies to selection change: if RO=true user cannot change
selection-->
<!ELEMENT singleChoice (condition?, onInit?, onChange?)>
<!ATTLIST singleChoice
    %commonCtrlAttrs;
    mapping CDATA #IMPLIED
    format CDATA #IMPLIED
    type (list | dropdown | radio) "radio"
    visibleRows CDATA #IMPLIED
>
<!ELEMENT multiChoice (condition?, onInit?, onChange?)>
<!ATTLIST multiChoice
    %commonCtrlAttrs;
    mapping CDATA #IMPLIED
    format CDATA #IMPLIED
    type (list | checkbox) "checkbox"
    mandatory (true | false) "false"
    visibleRows CDATA #IMPLIED
>
<!ELEMENT button (condition?, onInit?, onClick)>
<!ATTLIST button
    %commonCtrlAttrs;
    resource IDREF #IMPLIED
>
<!ELEMENT script (param*)>
<!ATTLIST script
    name ID #REQUIRED
>
<!ELEMENT param EMPTY>
<!ATTLIST param
    name CDATA #REQUIRED
    component IDREF #REQUIRED
>
```

Although the disclosure herein has been drawn to one or more exemplary systems and methods, many variations will be apparent to those knowledgeable in the field, and such variations are within the scope of the application. For example, although XML and a subset of ECMAScript are used in the examples provided, other languages and language variants may be used to define component applications. The proposed E4X standard scripting languages could be used in place of ECMAScript, for example. Further, other structured definition languages, than XML described above, can include such as but not limited to Resource Description Framework (RDF), XSLT, and XHTML.

The embodiments of the invention in which an exclusive property or privilege is claimed are defined as the follows:

1. A computing device for generating a deployable form of a client application configured to communicate over a network between an electronic device and a data source having a schema-based interface, the computing device comprising memory for storing instructions and a processor for executing the instructions such that when the instructions are executed the computing device provides:
   a data model for providing a persistent state of the client application, the client application including application components comprising one or more of at least one of a data component, a message component or a screen component having corresponding component definitions and a workflow component having a series of instructions;
   a code module for obtaining the application components from the data model and for generating a first application element including code representing the component definitions, expressed in a structured definition language, and the series of instructions;
   a mappings module for obtaining data source mapping information from the data model and for generating a second application element including mapping file descriptors corresponding to the data source mapping information, the mapping file descriptors for use by a server to mediate communication of the messages between the electronic device and the data source; and
   a resource module for collecting application resources of the client application and for generating a third application element including the application resources;
   wherein the first, second and third application elements are subsequently packaged as the deployable form of the client application.

2. The computing device of claim 1 further comprising a backend connector for providing the message mapping information of the data source to the data model.

3. The computing device of claim 2, wherein features of the backend connector are selected from the group comprising: connecting to a selected one from a plurality of the backend data sources; providing an interface for accessing the description of the backend data source; and providing for the identification of notification services configured for pushing notifications over the network to the device.

4. The computing device of claim 3, wherein the data source is a webservice or a SQL database and the description of the data source includes messages, operations and datatype descriptions.

5. The computing device of claim 2, wherein the resources are selected from the group comprising: static dependencies including images, soundbytes, and media; and localization information for each language supported by the client application.

6. The computing device of claim 2 further comprising a validator module for confirming the data model representation of application messages is consistent with the data source presentation of messaging operations.

7. The computing device of claim 6, wherein the validator module has functionality selected from the group comprising workflow integrity of the workflow component; consistency of parameters and field level mappings of the application components; consistency of screen control mappings of the screen component; consistency of screen refresh messages of the screen component; confirming a presence of message duplications in the message component; confirming a presence of data duplications in the application components; and validating the data model representation of data source messaging relationships.

8. The computing device of claim 2 further comprising a generator module for optimizing field ordering of the component definitions.

9. The computing device of claim 2, wherein the data model contains model constituents selected from the group comprising: Data Component Definitions; Global Variable Definitions; Message Component Definitions; Resource Definitions; Screen Component Definitions; Scripts; Style Definitions; and Mapping Descriptors of the data source.

10. A computer readable medium storing instructions, which when executed by a processor on a computing device cause the computing device to generate a deployable form of a client application, the client application including application components comprising one or more of at least one of a data component, a message component or a screen component having corresponding component definitions and a workflow component having a series of instructions, the instructions for implementing the steps of:
   obtaining the application components from a data model and generating a first application element including code representing the component definitions, expressed in a structured definition language, and the series of instruction;
   obtaining data source mapping information from the data model and generating a second application element including mapping file descriptors corresponding to the data source mapping information, the mapping file descriptors for use by a server to mediate communication of the messages between an electronic device and a schema-based interface of a data source; and
   collecting application resources of the client application and generating a third application element including the application resources;
   wherein the first, second and third application elements are subsequently packaged as the deployable form of the client application.

11. The computer readable medium of claim 10 further comprising the step of providing the message mapping information of the data source to the data model using a backend connector coupled to the data source.

12. The computer readable medium of claim 11, wherein features of the backend connector are selected from the group comprising: connecting to a selected one from a plurality of the backend data sources; providing an interface for accessing the description of the backend data source; and providing for the identification of notification services configured for pushing notifications over the network to the device.

13. The computer readable medium of claim 12, wherein the data source is a webservice or a SQL database and the description of the data source includes messages, operations and datatype descriptions.

14. The computer readable medium of claim 11, wherein the resources are selected from the group comprising: static dependencies including images, soundbytes, and media; and localization information for each language supported by the client application.

15. The computer readable medium of claim 11 further comprising the step of confirming the data model representation of application messages is consistent with the data source presentation of messaging operations.

16. The computer readable medium of claim 11 further comprising the step of checking workflow integrity of the workflow component.

17. The computer readable medium of claim 16, wherein the series of instructions is selected from the group comprising a programming language and a scripting language.

18. The computer readable medium of claim 11 further comprising the step of checking consistency of parameters and field level mappings of the application components.

19. The computer readable medium of claim 11 further comprising the step of checking consistency of screen control mappings of the screen component.

20. The computer readable medium of claim 11 further comprising the step of checking consistency of screen refresh messages of the screen component.

21. The computer readable medium of claim 11 further comprising the step of confirming a presence of message duplications in the message component.

22. The computer readable medium of claim 11 further comprising the step of confirming a presence of data duplications in the application components.

23. The computer readable medium of claim 11 further comprising the step of validating the data model representation of data source messaging relationships.

24. The computer readable medium of claim 11 further comprising the step of optimizing field ordering of the component definitions.

25. The computer readable medium of claim 10, wherein the data model contains model constituents selected from the group comprising: Data Component Definitions; Global Variable Definitions; Message Component Definitions; Resource Definitions; Screen Component Definitions; Scripts; Style Definitions; and Mapping Descriptors of the data source.

26. The computer readable medium of claim 10, wherein the component definitions include script for inclusion with the generated code.

* * * * *